(12) United States Patent
Baron

(10) Patent No.: US 12,084,103 B2
(45) Date of Patent: Sep. 10, 2024

(54) AUTOMATED SHOPPING CART THAT SELF STORES IN VEHICLE

(71) Applicant: Brett Baron, Palm Beach Gardens, FL (US)

(72) Inventor: Brett Baron, Palm Beach Gardens, FL (US)

( * ) Notice: Subject to any disclaimer, the term of this patent is extended or adjusted under 35 U.S.C. 154(b) by 7 days.

(21) Appl. No.: 18/221,800

(22) Filed: Jul. 13, 2023

(65) Prior Publication Data

US 2024/0208557 A1  Jun. 27, 2024

Related U.S. Application Data

(63) Continuation-in-part of application No. 18/088,693, filed on Dec. 26, 2022.

(51) Int. Cl.
*B62B 3/14* (2006.01)
*B62B 3/02* (2006.01)
*B62B 5/00* (2006.01)
*G05D 1/00* (2006.01)

(52) U.S. Cl.
CPC ............ *B62B 3/1404* (2013.01); *B62B 3/027* (2013.01); *B62B 5/0043* (2013.01); *B62B 5/0069* (2013.01); *G05D 1/0088* (2013.01)

(58) Field of Classification Search
CPC ..... B62B 3/1404; B62B 3/027; B62B 5/0043; B62B 5/0069; G05D 1/0088
See application file for complete search history.

(56) References Cited

U.S. PATENT DOCUMENTS

| | | | | |
|---|---|---|---|---|
| 5,997,013 A | * | 12/1999 | Claxton | B60P 1/045 280/124.112 |
| 8,979,115 B1 | * | 3/2015 | Baron | B62B 3/106 280/DIG. 4 |
| 10,131,373 B1 | * | 11/2018 | Ness | B62B 5/0003 |
| 2002/0149176 A1 | * | 10/2002 | Miller | B62B 5/0003 280/639 |
| 2016/0347341 A1 | * | 12/2016 | Tauber | B62B 3/027 |
| 2019/0302775 A1 | * | 10/2019 | Palan | B62D 57/028 |
| 2022/0197289 A1 | * | 6/2022 | Galin | B60P 3/007 |
| 2022/0289540 A1 | * | 9/2022 | Galin | B60P 3/007 |
| 2023/0126601 A1 | * | 4/2023 | Smock | B62B 3/04 320/109 |
| 2023/0150560 A1 | * | 5/2023 | Kalinowski | B62B 5/0069 414/800 |

* cited by examiner

*Primary Examiner* — Matthew J. Reda

(57) ABSTRACT

A cart includes a chassis configured to carry a basket and a support structure having a carrier coupled to the chassis, a pair of rear legs coupled to the carrier, and a pair of front legs coupled to the carrier, at least one of the pair of front legs and the pair of rear legs having motor driven wheels coupled thereto, at least one carrier actuator configured to move the chassis relative to the carrier, the pair of front legs including actuators which are configured to extend and retract the pair of front legs, and the pair of rear legs including actuators which are configured to extend and retract the pair of rear legs. The cart includes at least one sensor supported on the cart. The cart also includes at least one processing unit configured with software instructions that enable autonomous self-loading of the cart into a vehicle. The processing unit receives signals from the at least one sensor and providing command signals to any of the wheel motors, the at least one carrier actuator, the front leg actuators, and the rear leg actuators.

20 Claims, 21 Drawing Sheets

AUTOMATED SHOPPING CART THAT SELF STORES IN VEHICLE

REFERENCE TO RELATED APPLICATIONS

The present application constitutes a continuation-in-part of U.S. patent application Ser. No. 18/088,693 entitled AUTOMATED SHOPPING CART THAT SELF STORES IN VEHICLE, naming INVENTOR Brett Baron as inventor, filed 26, Dec., 2022, which is or is an application of which a application is entitled to the benefit of the filing date, and which is incorporated by reference herein in its entirety.

BACKGROUND OF THE DISCLOSURE

Field of the Disclosure

The present disclosure relates to shopping carts. More particularly, the shopping cart includes an automated feature for loading the entire shopping cart into a vehicle.

Description of the Related Art

Shopping carts have been in use since the mid-1930s when Sylvan Goldman obtained the first shopping cart patent on Mar. 15, 1938. Shopping carts are now widely used in almost every country now and continue to grow in popularity due to their many desirable features. However, unlike many other consumer products, the shopping cart has not evolved substantially to adjust to the needs of the modem-day consumer shopper.

Bulk discount store chains are popular stores for the modem consumer. Shopping at such chains becomes a chore when unloading groceries into the car due to the fact that many of these bulk shopping chains do not provide bags in the store in order to keep costs low for the shopper. Further, the size and weight of the bulk quantities may also be difficult for some consumers to load into their vehicle.

Another disadvantage of prior art shopping carts is they are not normally sold to consumers and are left in parking lots with large variations in cleanliness and repair of carts. Yet another example is that shopping carts are normally provided at fixed heights and taller and shorter shoppers must deal with the ergonomic difficulties from the fixed height cart designs of prior art. Finally, for urban shoppers, many either are forced to shop in small quantities which they carry by hand back to their city residence or they improvise by using small sized collapsible carts which once again are limited in volume as compared with shopping carts of prior art.

Some conventional carts include a collapsible feature that allows a shopper to store their personal shopping cart in their vehicle. However, these shopping carts still require users to exert force and effort to either place the entire cart into their vehicle. For example, U.S. Pat. No. 8,979,115 B1, which is hereby incorporated by reference in its entirety, provides a shopping cart with adjustable height and basket size that may easily collapse for the user to push into and pull or lift out of a vehicle. Another example of a collapsible cart is provided by U.S. Pat. No. 10,696,314, but this cart also requires the user to push or place it into the vehicle and pull it out of the vehicle. Further, the cart does not include a basket and requires the user to follow a multi-step collapsing process and support a substantial portion of the load of the cart while placing the cart into a vehicle. Further, U.S. Pat. No. 9,573,610 discloses another type of shopping cart with a basket that may be loaded into a car. However, as the basket is placed in the trunk of car, the basket tilts allowing anything in the basket to fall over, out of the basket and/or possibly break. Another disadvantage of this cart is that it is only designed for loading into car trunk and is not equipped for easy loading into a flatbed such as the rear of a sports utility vehicle (SUV) or truck.

Conventionally, shopping carts have been configured in very basic ways, typically just a manually pushed metal or plastic basket on wheels. However, the proliferation of robotics and other inexpensive electronics provides an opportunity to make shopping carts with improvements in comfort, useability, automation, and personalization, among others.

As a result, there is a need for a collapsible cart configured to self-load into a vehicle with a flatbed while placing the cart contents safely into the vehicle. This would provide ease for varying physical strengths and abilities and relieve the strain caused by loading heavy items and carts into their vehicles. There is also a need for other features of a collapsible cart configured to self-load into a vehicle which improve the useability of the cart as compared to carts of the prior art. Further, there is a need for a cart having other automation features and features providing increased ease-of-use and convenience.

SUMMARY

In one or more various aspects, a method includes but is not limited to [independent claim language]. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software (e.g., a high-level computer program serving as a hardware specification), and/or firmware configured to effect the herein-referenced method aspects depending upon the design choices of the system designer, and limited to patentable subject matter under 35 U.S.C. 101.

In one aspect, a computer program product may be expressed as an article of manufacture that bears instructions including, but not limited to, [independent claim language]. In addition to the foregoing, other computer program products are described in the claims, drawings, and text forming a part of the disclosure set forth herein.

In one aspect a cart includes a chassis configured to carry a basket and a support structure having a carrier coupled to the chassis, a pair of rear legs coupled to the carrier, and a pair of front legs coupled to the carrier, at least one of the pair of front legs and the pair of rear legs having motor driven wheels coupled thereto, at least one carrier actuator configured to move the chassis relative to the carrier, the pair of front legs including actuators which are configured to extend and retract the pair of front legs, and the pair of rear legs including actuators which are configured to extend and retract the pair of rear legs. The cart includes at least one sensor supported on the cart. The cart also includes at least one processing unit configured with software instructions that enable autonomous self-loading of the cart into a vehicle. The processing unit receives signals from the at least one sensor and providing command signals to any of the wheel motors, the at least one carrier actuator, the front leg actuators, and the rear leg actuators.

In another aspect a cart includes a chassis configured to carry a basket. The cart also includes a support structure having a carrier coupled to the chassis, a pair of rear legs coupled to the carrier, and a pair of front legs coupled to the carrier, at least one of the pair of front legs and the pair of rear legs having motor driven wheels coupled thereto, at least one carrier actuator configured to move the chassis relative to the carrier, the pair of front legs including actuators which are configured to extend and retract the pair of front legs, and the pair of rear legs including actuators which are configured to extend and retract the pair of rear legs. Further, the cart includes at least one sensor supported on the cart and at least one processing unit configured with software instructions that enable autonomous self-loading of the cart into a vehicle, the processing unit receiving signals from the at least one sensor and providing command signals to any of the wheel motors, the at least one carrier actuator, the front leg actuators, and the rear leg actuators.

In yet another aspect a method of stowing a collapsible cart includes adjusting autonomously a cart height such that a first end of a chassis of a cart is rested on a stowage surface. The method also includes pushing autonomously the chassis so that the whole chassis rests on the stowage surface. Further, the method includes retracting autonomously and stowing autonomously a first pair of legs into the chassis. Further still, the method includes retracting and stowing a second pair of legs into the chassis.

In addition to the foregoing, various other method and/or system and/or program product aspects are set forth and described in the text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION

Figure 1:
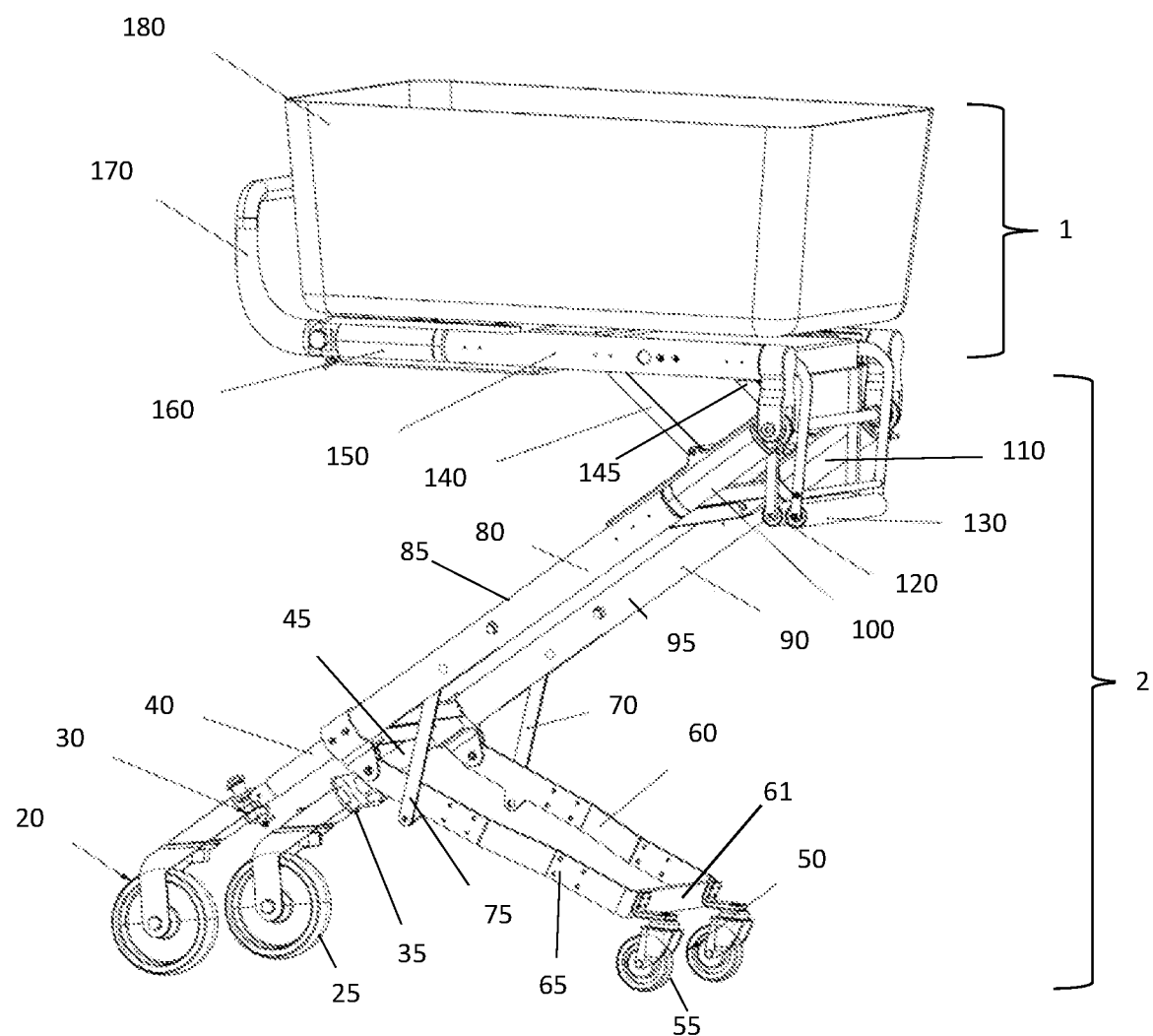
FIG. 1 is a perspective view of an embodiment according to this disclosure, of a shopping cart in a standing and driving position.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" or "coupled" are each intended to include integrally formed members, direct connections between two distinct members without any other members interposed therebetween and indirect connections between members in which one or more other members are interposed therebetween.

The terminology includes the words specifically mentioned above, derivatives thereof, and words of similar import.

Referring now to the drawings in detail, wherein like numbers are used to indicate like elements throughout, there is shown in FIGS. 1-7E, an embodiment of an automated, self-storing cart 10 including a collapsible structure combined with the upper actuators 160, 165, lower actuators 100, 110, control system 395, push mechanism 230, and battery 193 that provides great ease of use. With the push of a button 192, 194, 196, the user may automatically move the cart through various positions such as height adjustment, self-loading and stowing of the cart 10 as well as contents on a flatbed of an SUV or truck. This alleviates the inconvenience and/or physical strain of having to unload groceries into a vehicle, physically lift and load the cart into one's vehicle and allows for beneficial ergonomics with the height adjustability. Further, the cart 10 is configured to move into a flatbed of a truck or rear of SUV without causing damage to the exterior or interior of the SUV or truck.

The cart 10 includes an upper portion 1 and a lower portion 2 connect by an upper pivot connector 152 and upper support bars 140, 145. The upper portion includes the basket 180, horizontally moveable carriage 178, push mechanism 230, first and second lateral supports 148 and 149 which may include top motor holders 150,155 and upper actuators 160 and 165, handlebar 170, control panel 190, battery 193, compartment 205 a fixed roller 120, movable roller 130 and push mechanism 230. The lower portion 2 includes second front legs 80, 90 and first or rear legs 80, 90 which include wheels 50, 55 and 20, 25, respectively. The rear legs 80, 90 further include lower actuators 100 and 110, pivot mechanisms 30, 35 extendable leg portions 40 and 45, support bars 70 and 75, lower actuators 100 and 110 and shafts 200 and 220.

Figure 2A:
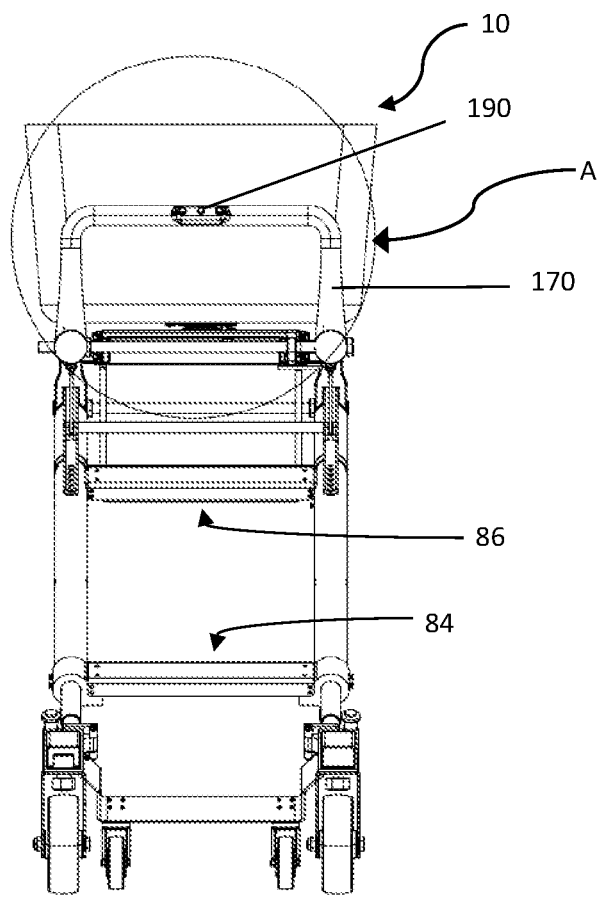
FIG. 2A is a side view, depicting the rear or handle side, of the shopping cart of FIG. 1.
Figure 2B:
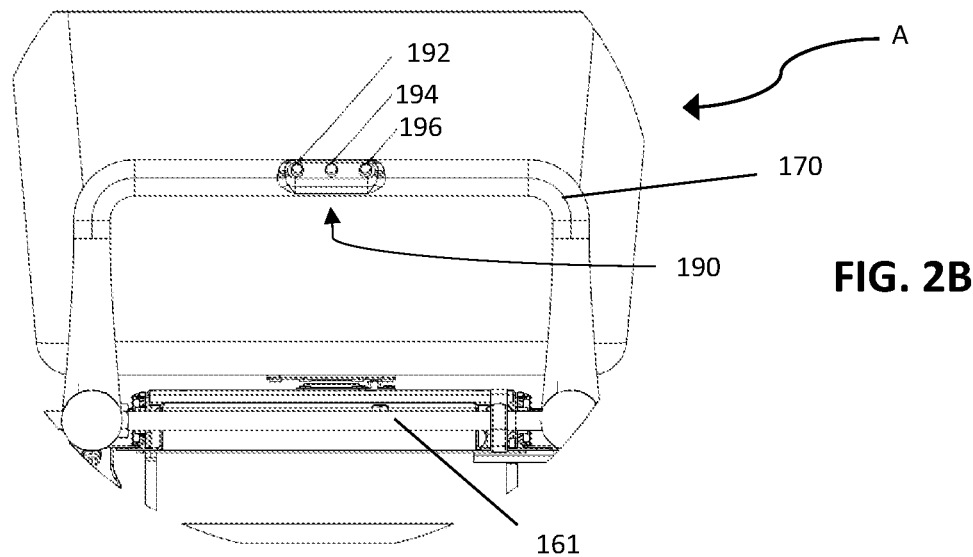
FIG. 2B is an exploded view of section A of FIG. 2A.
Figure 2C:
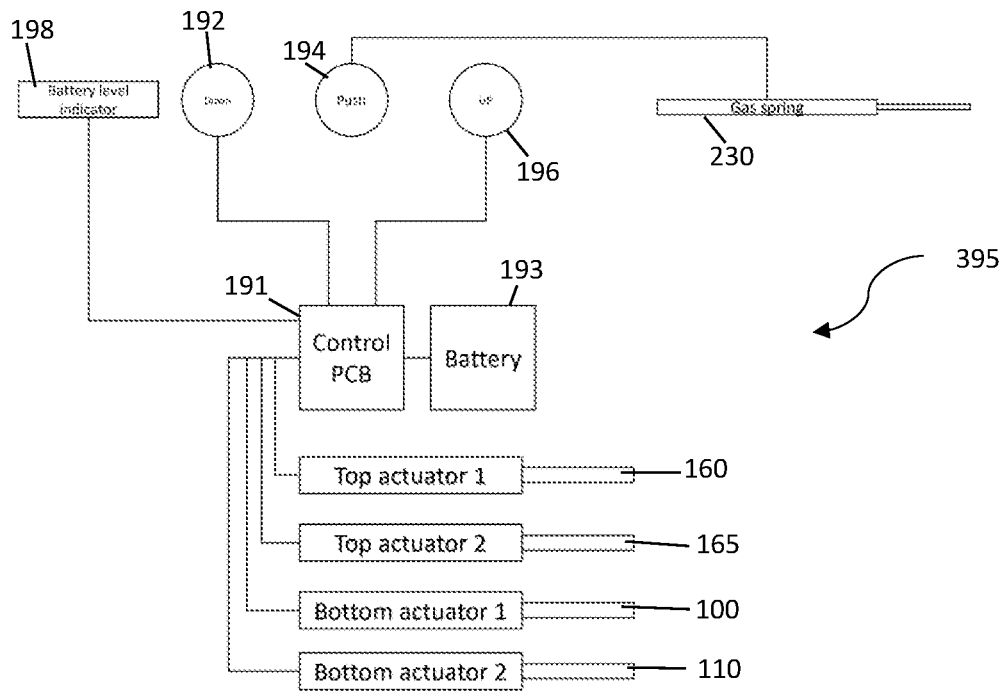
FIG. 2C is a schematic diagram of an embodiment of a control system for the shopping cart of FIG. 1.
Figure 2D:
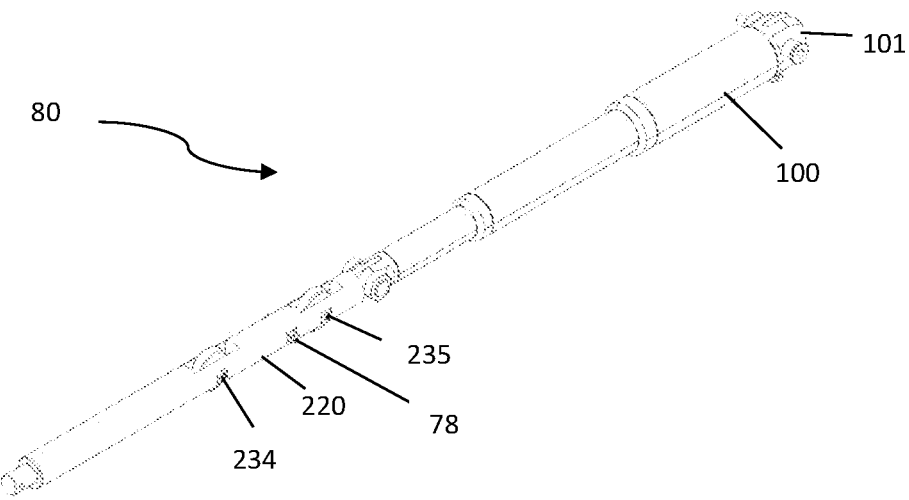
FIG. 2D is a perspective view of a rear leg, according to this disclosure, of the cart depicted in FIG. 1.
Figure 4A:
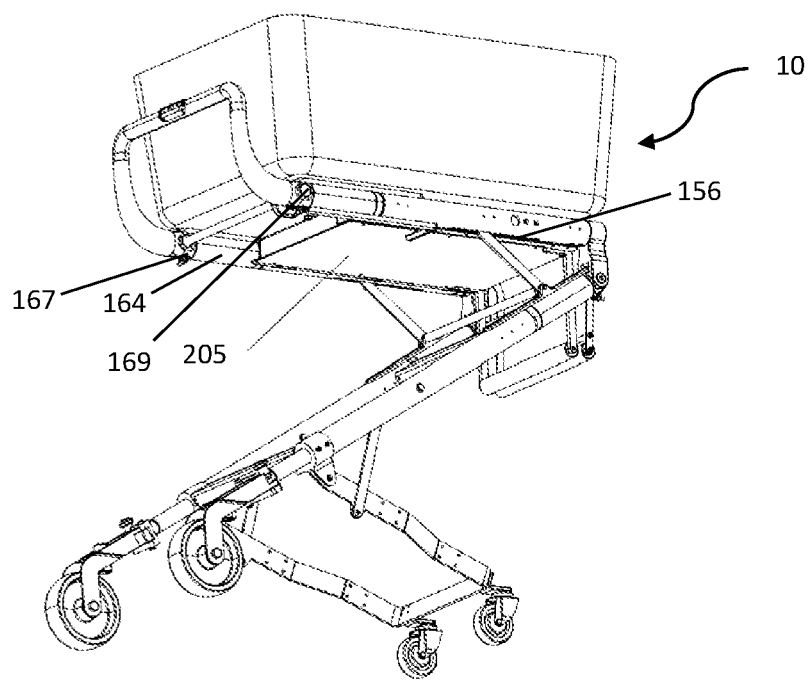
FIG. 4A is a perspective view of the shopping cart of FIG. 1 depicting the underside the cart of FIG. 1.
Figure 4B:
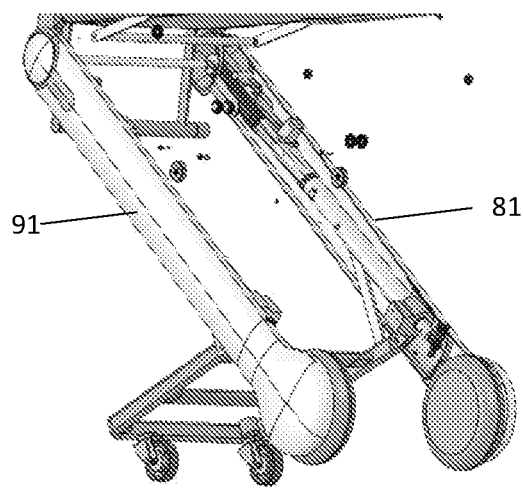
FIG. 4B is a perspective view of the lower portion of the shopping cart of FIG. 1 with protective covers.

To provide for ease of use, as shown in FIGS. 2A-2C, the cart 10 may incorporate a control system 395 and control panel 190 for automating the use and movement of the cart 10. The control panel 190 allows a user to enter commands utilizing the corresponding down button 192, push button 194 and up button 196. As shown in FIG. 2C, up and down buttons 192, 196 are operatively connected to a controller 191 such as printed circuit board which is operatively connected to each upper actuator 160, 165 and each lower actuator 100, 110. The control system 395 may be further connected to a battery 193, and the control panel 190 may include a battery level indicator 198. It is noted that the wiring (not shown) for connection of control system 395 to the various portions of the cart 10 such as the controller 191, control panel 190, battery 193 may be placed within portions of cart 10 such as the handle 170, compartment 205. Alternatively, the wiring may be external to the rear legs but concealed within covers 81 and 91, as shown in FIG. 4b, which may overlay corresponding legs 80, 90.

The control panel 190 and control system 395 may include other forms. For example, the control system may include short range wireless technology for connection with a computerized device such as a smartphone. The control panel 190 may be a graphical user interface (GUI) located on user's smartphone or other computerized device.

The battery 193 and control panel 190 may be located within compartment 205 which is located below basket 180 and between the first and second supports or top motor holders 150, 155. The compartment 205 may be fixed to each top motor holder 150, 155 via suitable fasteners such as threaded fasteners, rivets, or clips. The battery 193 may be a rechargeable battery and can be accessed via panel 221 for charging. Charging may be performed by removing the battery and/or plugging the cart into the proper charging system via a cord (not shown).

Figure 5A:
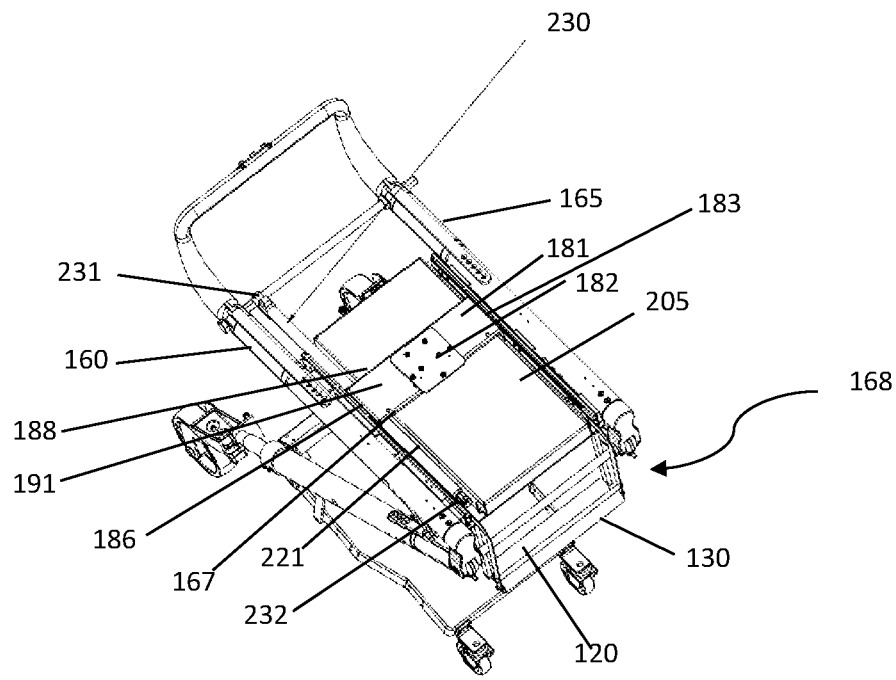
FIG. 5A is a perspective view of the shopping cart of FIG. 1 depicting the cart without the basket in a first or retracted position.
Figure 5B:
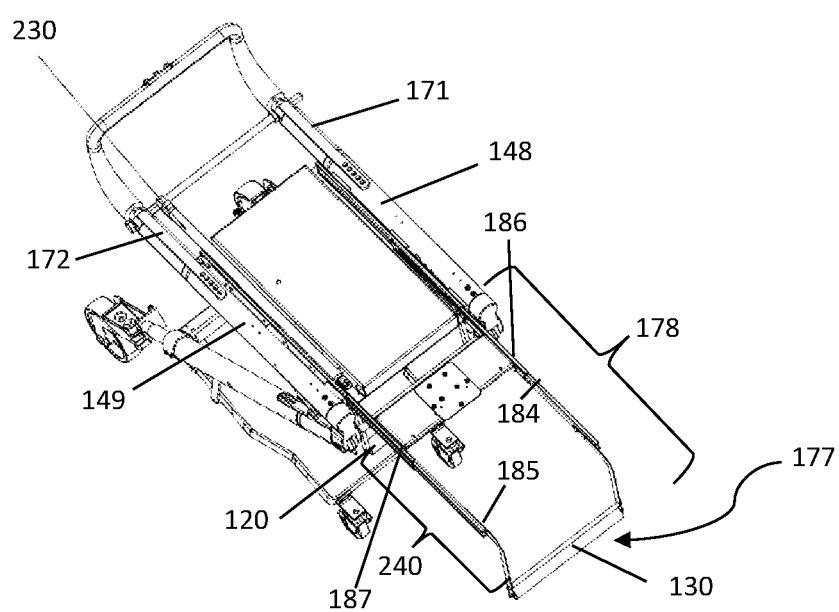
FIG. 5B is a perspective view of the shopping cart of FIG. 1 depicting the cart without the basket in a second or extended position.

While the vertical movement of the cart 10 is controlled via the up and down buttons 192, 196, the cart 10 also provides for push or horizontal movement of the basket 180 relative to the front legs 60, 65 and rear legs 80 and 90. The horizontal movement is provided by the push mechanism 230 which may be a suitable movement device such as a gas spring as shown in FIGS. 2C, 5A and 5B. Control panel 190 includes a push or lateral movement button 194 that may be directly connected to the push mechanism 230 for activation of the mechanism 230 to cause the lateral movement of the basket 180. In the case of the control panel 190 being a GUI, the control system 395 may activate an additional actuator to activate button 194 which may be located within compartment 205.

The basket 180 is mounted to a horizontally or laterally moving carriage 178 (FIG. SB) including a platform or base 181, mount 182, first arm 184, second arm 185 and moveable roller 130. The base 181 includes a top surface 191 that extends laterally between an anterior side 188 and posterior side 187 and a first lateral side 183 and a second lateral side 189, and the base 181 may vary in size to accommodate different types of loads and functions. The mount 182 is incorporated into the base 181 or attached thereto. The basket 180 and mount 182 may include an interlocking connection that allows the basket 180 to click into a fixed position on the base 11 and/or the basket 180 and mount 182 may be connected using suitable connectors such as threaded fasteners, rivets or hook and loop. The base 181 is fixed to a position between the first and second arms 184, 185 and may be attached to each arm 184, 185 using suitable connector such as threaded fasteners or rivets. The carriage 178 is connected to the push mechanism 230 via connecting at least one arm 184, 185 which as shown in FIGS. SA and SB may be the first arm 184. The first and second arms 184, 185 may slide back and forth along respective slide supports 186, 167 which are fixedly connected to interior portions of the corresponding top motor holders 150, 155. It is noted, that rather than include basket 180, the base 181 may also remain as a platform with a flat or angled surface or platform corresponding to different objects that may be moved with the cart 10.

The push mechanism 230 causes the carriage 178 to move horizontally over and/or away from the rear legs 80, 90. It is noted that this may also be accomplished using manual force pushing on the basket 180 or handle 172 (FIG. 7C) while holding handlebar 170. Therefore, the carriage 178 and the moveable roller 130 have at least two positions. The first position is a retracted position 168, as shown in FIG. SA, in which the rollers 120, 130 are both to one side of the mount 182. The second position 177 is shown in FIG. SB in which the fixed roller 120 and moveable roller 130 are positioned on either side of the mount 182. In this second position, the fixed roller 120 and moveable roller 130 may be spaced apart by a horizontal second distance 240 which is greater than the horizontal distance 241 (FIG. 3B) between the two rollers 120, 130 in the first position. While the horizontal distance 240, 241 changes with the extension of the carriage 178, both the fixed roller 120 and moveable roller 130 remain vertically aligned such that the axis of rotation of each roller is coplanar. In other words, the fixed roller 120 and moveable roller 130 and are not vertically displaced during the extension or retraction of the carriage. For example, the fixed roller 120 and moveable roller 130 may both rest on the same horizontally extending plain D-D (FIG. 7D) such as the liftgate 260 and/or flatbed 270 of a truck or SUV and maintain the horizontal plain of the basket 180. This movement and utilization is shown in FIGS. 7B-7E.

It is noted that the fixed roller 120 and moveable roller 130 are downwardly extending load bearing supports incorporating and moving wheel as depicted in the drawings. The wheel assists with reducing friction associated with the lateral movement of the load.

However, instead of wheels, each roller 120, 130 may include devices such as friction reducing pads or blades to reduce the friction of the load.

Figure 7A:
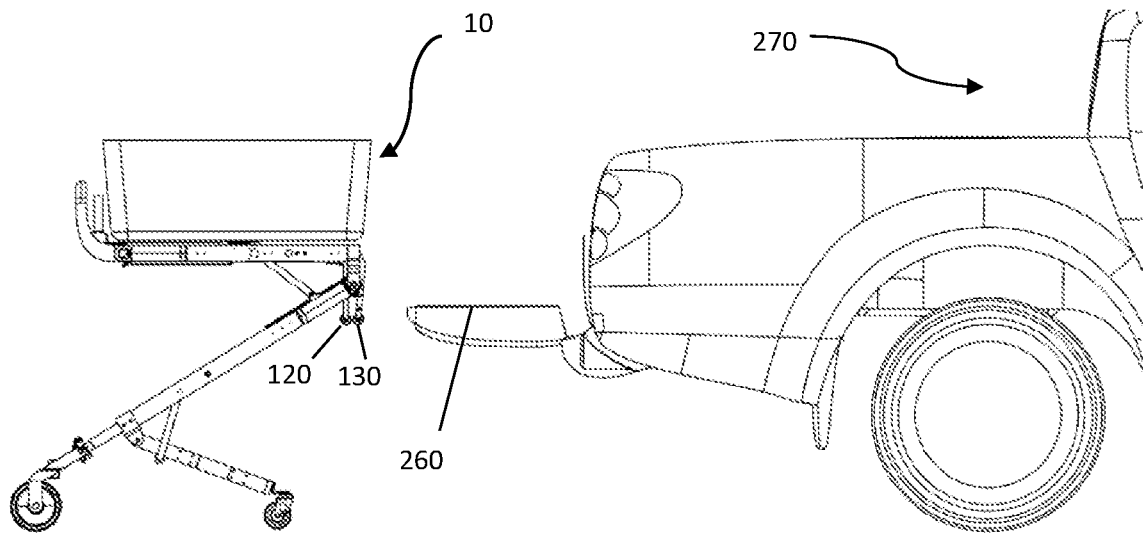
FIG. 7A is a side view of the cart of FIG. 1 in the driving position approaching a pick-up truck bed.
Figure 7B:
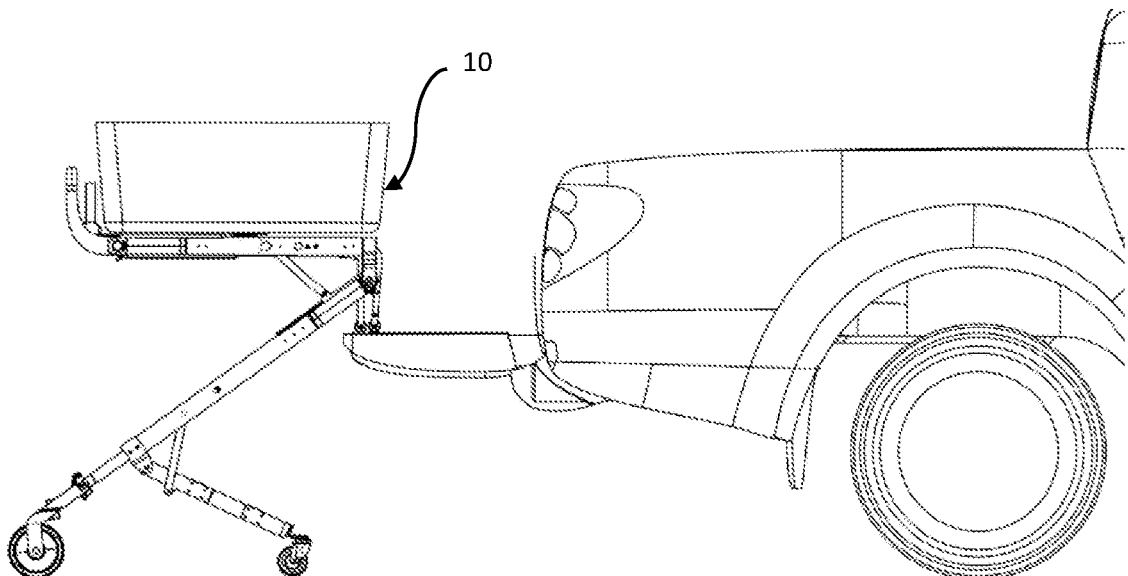
FIG. 7B is a side view of the shopping cart, of FIG. 7A, with the rollers resting on the truck bed.
Figure 7C:
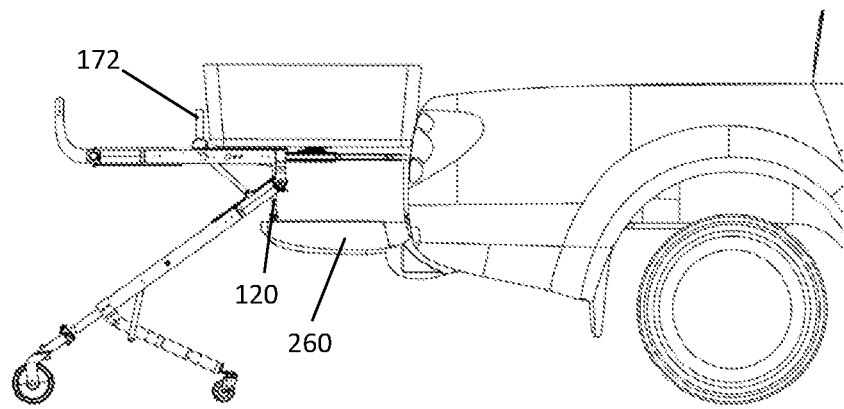
FIG. 7C is a side view of the shopping cart of FIG. 7A with the basket and carriage in the in the extended position and moving into the pick-up truck bed.
Figure 7D:
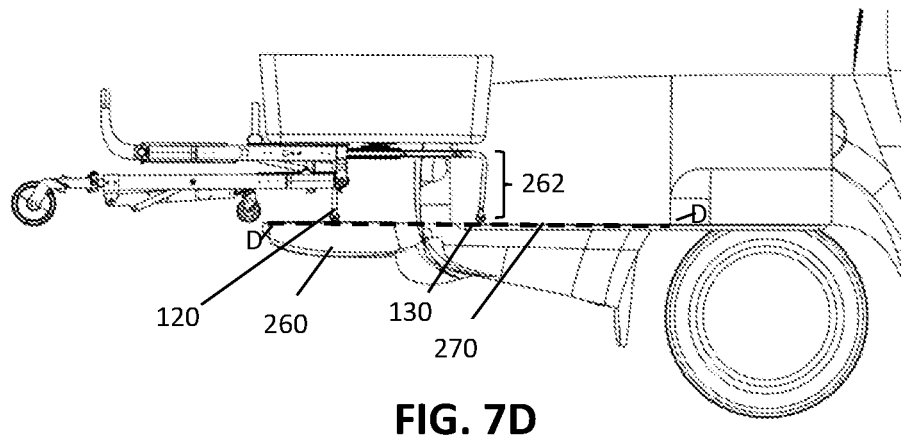
FIG. 7D is a side view of the shopping cart of FIG. 7A with the basket and carriage in the in the extended position and legs pulled up for further movement of cart onto the truck.
Figure 7E:
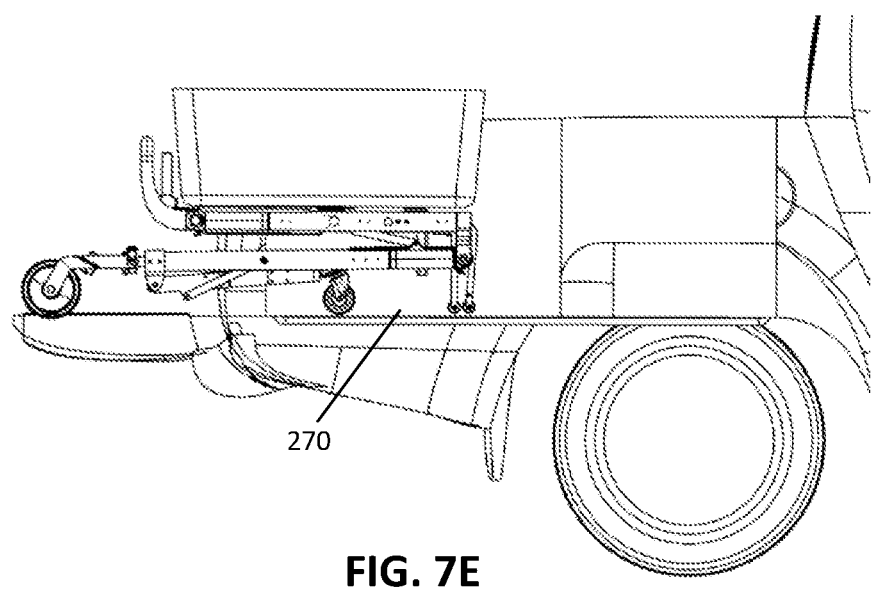
FIG. 7E is a side view of the shopping cart of FIG. 7A in the folded position after the cart has moved entirely onto the truck bed.

As shown in FIG. 7D, the fixed roller 120 and moveable roller 130 extend downwardly the same distance from the base 181. This allows the base 181 to remain horizontal on the bed 270 when loading the cart 10 into a vehicle.

Figure 3A:
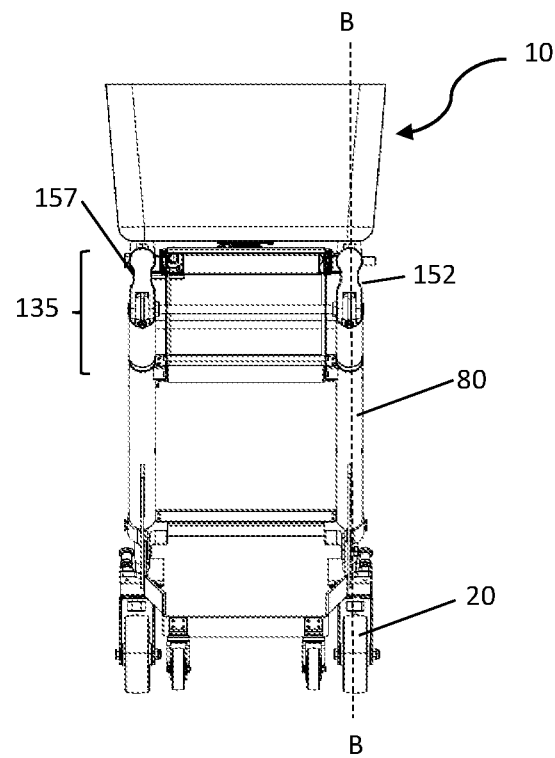
FIG. 3A is a side view, depicting the forward or basket side, of the shopping cart of FIG. 1.
Figure 3B:
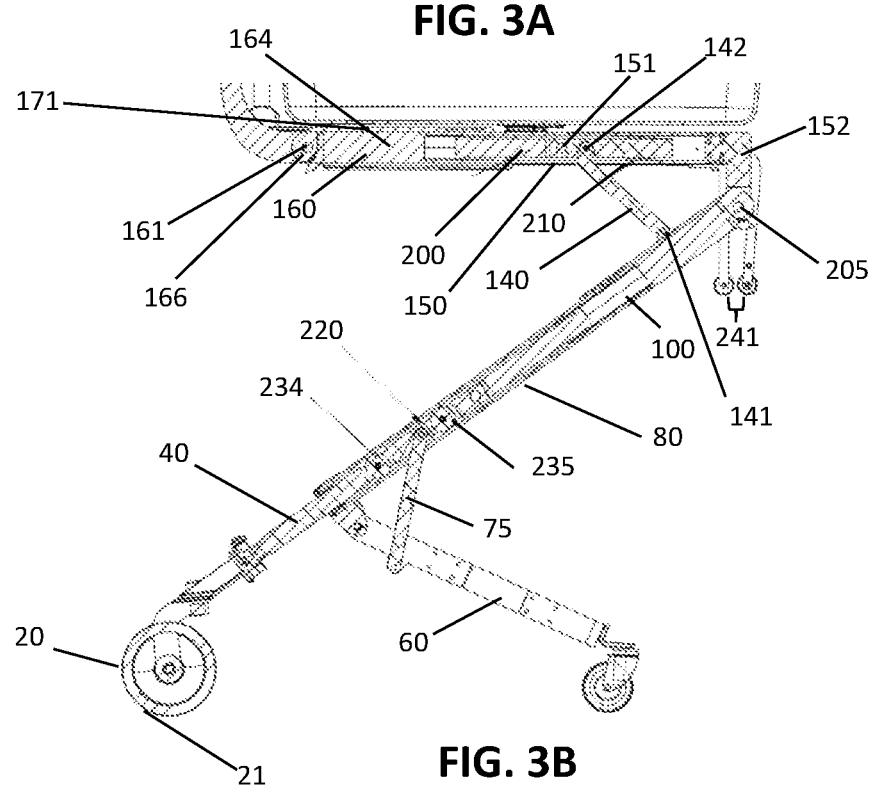
FIG. 3B is cross sectional side view of the shopping cart of FIG. 1 along line B-B of FIG. 3A.

FIG. 3B provides a side cross sectional view, along line B-B of FIG. 3A, of a rear leg 80, top motor holder 150 and wheel 20 as well as the connection therebetween. It is noted that the configuration of the other rear leg 90, top motor holder 155 and wheel 25 may be the same as that shown along line B-B. Top motor holder 150 extends substantially horizontally or laterally with respect to rear leg 80 which is rotatably moveable with respect to holder 50. A pivot connector 152 is connected between the top holder 150 and leg 80, and the connector 152 is configured to maintain the top holder 150 in a horizontally extending position while the leg 80 may rotate between a substantially horizontally extending position and a vertically extending position.

The leg includes an anterior end 101 (FIG. 2D) and posterior end 21. Movement of the leg 80 with respect to the top holder 150 is effectuated via the upper actuator 160 which includes a shaft 200 that is moveable with a carrier or linear bearing 210 within the top motor holder 150. The support bar 140 may be connected to the bearing 210 at a position between actuator 160 and linear bearing 210. As the actuator 160 displaces the shaft 200 in the horizontal direction, the bearing 210 and support bar 140 may be pushed and/or pulled, depending on the direction of shaft 200 displacement, causing the leg 80 to rotate about the pivot connector 152 and move closer or further away from the holder 50. That is the leg 80 may be extended such that it extends vertically and downwardly from the platform, and the leg 80 may be retracted such that it is foldable parallel to the platform or top motor holder 150.

It is noted that the lever or support bar 140 is also rotatably or moveably secured to both the bearing 210 and leg 80. Connectors 141 are positioned at each end of the support bar 140. Suitable connector 141 allow for rotation between the bar 140 and shaft 200 as well as the leg 80. The connectors 141 may include pins, bars, threaded fasteners, etc.

The lower leg 80 may include a lower actuator 100 with an extendable and retractable shaft 220 that is rotatably connected to lever or support bar 70 which is further moveably or rotatably connected to the front leg 60. The point of connection of the shaft 220 and support bar 70 may be disposed between a pair of wheels 234, 235 which function to reduce friction. The actuator 100 within the lower leg 80 functions to retract and extend the support bar 70. Thus, as the actuator 100 causes the shaft 220 to extend as well as extendable leg portion 40, the length of the leg 80 increases as well as the height of the cart 10. On the other hand, when the actuator 110 retracts the shaft 220, the support bar 75 is pulled upwardly as well as the connected front leg 60, and the height of the cart 10 is decreased.

Figure 6:
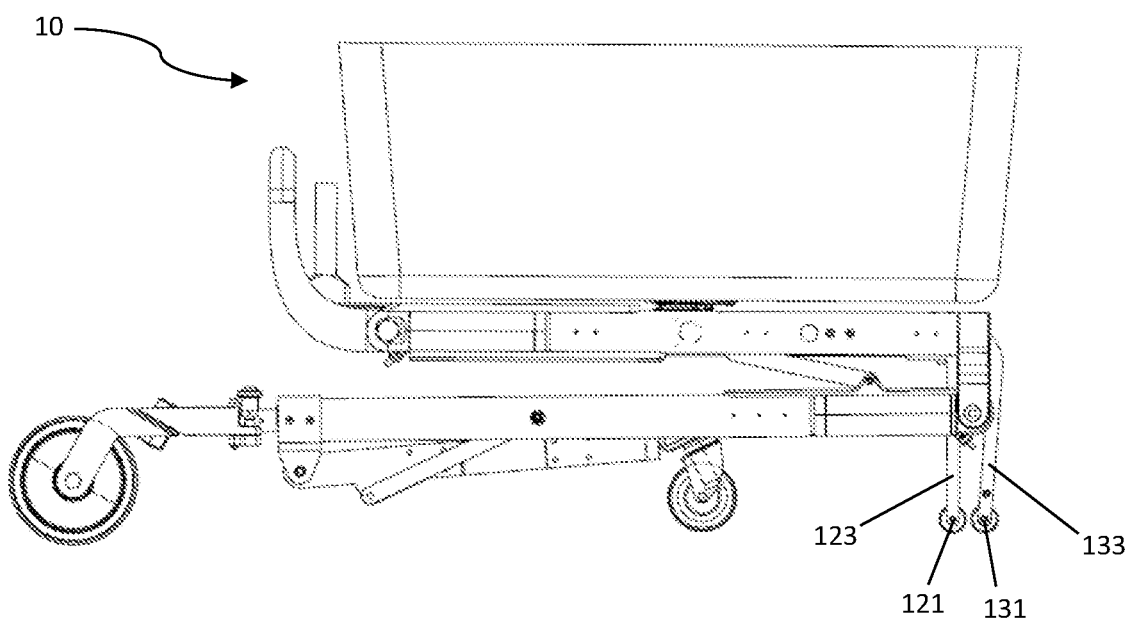
FIG. 6 is a side view of the shopping cart, as depicted in FIG. 1, in the folded position.

Further, if the actuator 100 is fully retracted the front leg 60 may be completely folded on the rear leg 80 as shown in FIG. 6.

FIG. 6 depicts a shopping cart in a fully collapsed, folded or flattened state. Only, one simple step is required to collapse the cart. The down button 192 is pushed which activates the actuators 160, 165 which retracts the shaft 200 which pulls the upper support bars 140, 145 which pulls rear legs 80, 90. Due to the pivot connectors 152, the rear legs 80, 90 move towards the top motor holders 150 and 155. In other words, pushing the down button 192 causes the actuators 160, 165 to pull the lower portion 2 towards the upper portion 1. Simultaneously, lower actuators 100, 110 pull or retract the shaft 220 which pulls the lower support bars 70, 75 which pulls the front legs 60, 65 to fold upwardly or upon rear legs 89, 90. Thus, the action of the lower actuators 160, 165 lowers the cart, while keeping the cart level.

From folded state, the user may place the cart 10 in driving mode, which is shown in FIGS. 1, 7A and 7B, with just the push of the up button 196. Upon pressing button 196, the actuators 160, 165 extends the shaft 200 which pushes the upper support bars 140, 145 which pushes the back legs 80, 90 causing the legs 80, 90 to extend. Simultaneously, the lower actuators 100, 110 are pushing the shaft 220 and lower support bars 70, 75 which pushes the front leg 5. Thus, the cart 10 is raised while being kept level.

Please note that the height of the cart 10 may be adjusted by pressing the up and down buttons 192, 196. Rather than allowing the cart to completely collapse or extend, the buttons 192, 196 may be pressed until the desired cart height is reached.

The shopping cart 10 may be easily loaded and secured into the rear storage space of modern vehicles including trucks and sport utility vehicles (SUV) with a full load of groceries. Referring next to FIGS. 7A-7E and FIG. 9, the preferred method 400 of loading the shopping cart 10 into the trunk storage area of an SUV or flatbed 270 of a truck may be accomplished by several simple steps as follows. Initially, in step 410, the cart 10 height may be adjusted by pressing the up button 196 or down button 192 or up button 196 to raise or lower the cart 10 height until the appropriate height is achieved. The desired height is one in which the rollers 120, 130 are on the same level as the location where the cart 10 will eventually come to rest. In this example, that location and height is the truck bed 270 and/or liftgate 260 (FIG. 7B). Next in second step 420, the user manually moves and/or pushes the cart 10 so that the rollers 120, 130 rest on the liftgate 260. In step 430, the carriage 178 with basket 180 is extended onto the liftgate 260 and truck bed 270. This may be accomplished by pressing button 194 to activate the push mechanism 230. During this step, the carriage 178 is horizontally extended over the truck bed 270 and the rollers 120, 130 become more horizontally spaced apart with the fixed roller 120 remaining on the liftgate 260 and the moveable roller 130 advanced to the truck bed 270. As a result, the carriage 178 and weight of the basket 180 and its contents is moved further onto the truck bed 270 (FIG. 7C).

As the carriage 178 starts to extend over the truck bed 270 and/or liftgate 260, the support of the weight of the cart 10 and the basket contents begins to distribution of the change. Initially all of the weight is supported by the cart 10. At the moment, the carriage 178 begins to extend the weight is supported by moveable roller 130 and fixed roller 120 as well as the remaining wheels 20, 25, 50, 55 on the ground. If in case that the cart 10 is empty, 50% of the force of the weight is on the rollers 120, 130, and the other 50% of the force of the weight is on the wheels 20, 25, 50, 55 which are on the ground. However, when the cart 10 is empty, when the cart 10 is full with a load in basket 180, than the percentage of weight supported by the rollers 120, 130 and truck is much higher and much lower for the weight on the ground via rollers 20, 25, 50, 55.

To decrease the amount of weight that the user would be required to support, the fixed roller 120 functions as a fulcrum that transfers weight of the cart 10 contents to the truck bed 270. When the cart 10 is empty, the weight of the legs 80, 90, 60, 65 is greater than the weight of the carriage 178. Therefore, the fixed roller 120 does not transfer the weight of the legs 80, 90, 60, 65 to the truck bed 270, and the user would be required to support 50% percent of the load. In this case, the cart 10 is the lightest. On the other hand, when the basket 180 is full to maximum weight capacity or the weight in the basket 180 is greater than the weight of the legs 80, 90, 60, 65, the fixed roller 120 transfers the force of the weight to the trunk bed 270. Therefore, the user will just need to assist the cart 10 in remaining still until the folding process is completed. (Additionally, to assist with keeping the cart still, the user may activate rear wheel locks (not shown) before folding until the folding process is completed.)

In step 440, the legs 80, 90, 60, 65 are pulled up and the cart 10 begins to move into the folded position as shown in FIG. 6. This is accomplished by pressing the down button 192. When the user presses button 192, the weight supported by the wheels on the ground will be supported by the user until the folding is complete and the cart 10 can is resting on the truck bed 270 and/or liftgate 260.

In step 450, the cart 10 is resting on the truck bed 270 and/or liftgate 260 in the fully collapsed state as shown in FIG. 6. The weight of the cart 10 and/or load in the basket 180 is now fully supported by the truck via front wheels 50, 55 as well as the fixed and moveable rollers 120, 130. Also, the carriage 178 is in the fully retracted position so the rollers 120, 130 are separated by first distance 241.

In step 460, the user may, if the size of the truck bed 270 is too short, shorten the length of the cart by folding the rear wheels 20. This is done by releasing the pivot 30 and manually folding the wheels 20, 25 up.

Now, the cart 10 is in the folded or collapsed position on the truck bed 270 with the entire cart 10 and the contents of the shopping experience. The user was not required to exert energy and waist time by moving and organizing each individual item into the truck bed 270 or other vehicle location and the contents of the cart remained level and safely organized. User may close the gate of the rear of the vehicle and drive away.

Although the rear of a truck is used in this example, the cart 10 may be easily loaded into other vehicles with flat beds such as vans and SUVs.

Figure 10:
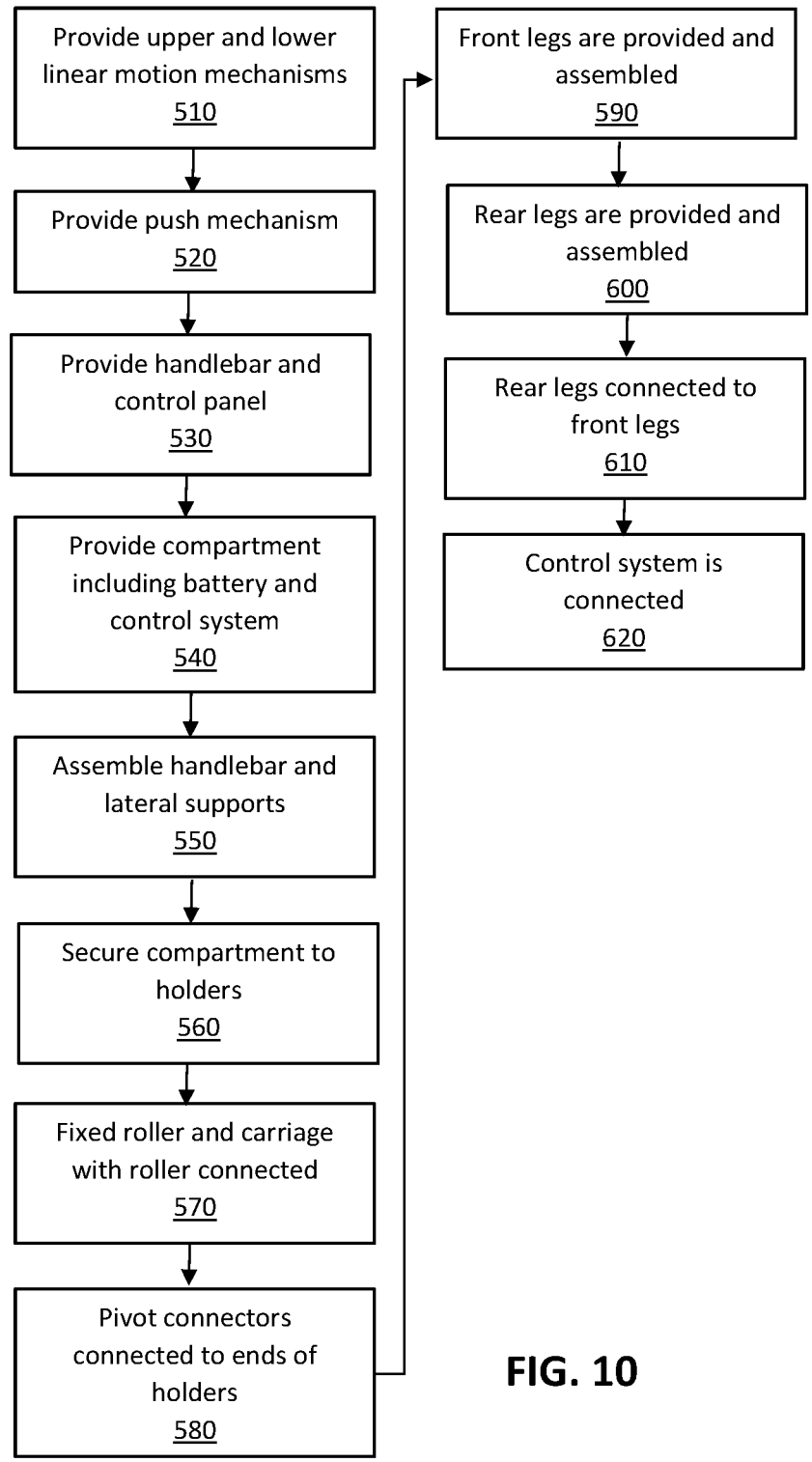
FIG. 10 is a flow diagram of a method of making the cart of this disclosure.

FIG. 10 depicts a method 500 of making the cart 10 according to this disclosure. In step 510, the upper and lower linear motion mechanisms are provided such as actuators 100, 110, 160, 165 are provided. The upper actuators 160, 165, lower actuators 100, 110 may be electrically powered linear in-line actuators such as with extendable and retractable upper shafts 200 and lower shafts 220. Other types of linear actuators, such as a rotating screw linear actuator, may also be adapted for use in the cart 10. Also, other types of linear motion mechanisms are foreseeable including stepper motors with gear wheels and belts.

In step 520, the push mechanism 230 is provided. The push mechanism may be a gas spring or other suitable device.

In step 530, the handlebar 170 and control panel 190, as discussed above, are provided. The control panel 190 may be added to the handlebar 170 or formed integral with the handlebar 170. Preferably, the handlebar 170 is formed of steel, aluminum, metal alloys, hard plastic, etc. Also, the handlebar 170 may be hollow and the electrical wires related to the control of the upper and lower actuators 100, 110, 160, 165 and any tubing connecting to the push button 194 to the push mechanism 230 may be disposed within the handlebar 170.

The control panel 190 may include two buttons 192 and 196 for electrical control of the height of the cart 10. Button 194 relating to the carriage 178 extension may be a pressure or pneumatic button for configured to activate the and push mechanism 230.

In step 540, compartment 205, including the battery 193 and control system 395, as described above is provided.

In step 550, the handlebar 170 and lateral supports 148, 149 are assembled. Initially, the top motor holders 150, 155, upper linear actuators 160, 165, connector bars 171, 172 (FIG. SB), a pair of linear bearings 210 and cross bar 161 (FIG. 2B) are provided. The linear bearings 210 are selected such that the bearings 210 are of suitable size to connect to the shafts 200 of actuators 160, 165.

The top motor holders 150, 155 may be formed such that they are tubular with a slot 156 (FIG. 4A) on the lower side and configured to hold the pivot connector 152 at one and abut the corresponding actuator motor portion 154, 164 (3B, 4A) at the other end. The 154 slot permits the corresponding support bars 140, 145 to move when forced by the corresponding actuator 160, 165 and the connection of the bars 140, 145 to the corresponding bearing 210. The top motor holders 150, 155 may are formed such that they are of suitable size and strength to slidingly hold the linear bearings 210 and abut the actuator 160 motor portions 164. Additionally, holders 150, 155 may be formed of a strong material such as a metal (i.e., steel or aluminum) or metallic compound or alloy as well as a strong plastic.

A linear bearing 210 is secured to each shaft 200 of the upper linear actuators 160, 165 with a fixed connector 151 such as rivet, threaded faster or pin. The bearing 210 should be connected to the shaft 200 such that the shaft is spaced apart from the actuator motor portion 154, 164 at least 100 mm to permit the bearing 210 ample space to move back and forth without being blocked by the actuator motor portion 154, 164.

Connector bars 172, 171 are secured to the end of each holder 150, 155 that will abut corresponding holders 150, 155. The connector bars 172, 171 may be secured with rivets, threaded fasteners.

A bearing 210 fixed to a shaft 200 is inserted into the end of each motor holder 150, 155 with the connector bars 172, 171 until the end of each motor holder abuts the corresponding actuator portion 164, 154.

The cross bar 161, push mechanism 230, actuator motor portion 164, 154 and the handlebar 170 are secured together. The cross bar 161 may be advanced through an opening (not shown) on one end of the handlebar 170, an opening on end portion 166 of actuator 160, and opening 231 on the push mechanism 230. Next, the bar 161 may be advanced through an opening on end portion 176 of actuator 165 and an opening (not shown) on the other end of the handlebar 170. Both ends of the cross bar 161 may be secured with suitable fasteners 169 such as threaded fasteners or pins. Additionally, it is noted that the push mechanism 230 may be secured in place on the cross bar 161, via clamps, and/or spacers, etc. to prevent lateral movement and maintain the space between the actuator 160, 165 that it is adjacent as well as the space between mechanism 230 and compartment 205.

In step 560, the compartment 205 may be secured to both holders 150, 155 using threaded fasteners or pins, etc. The compartment 205 is secured such that the compartment 205 is between the holders 150, 155.

In step 570, the fixed roller 120 and carriage 178 with roller 130 are provided and connected. The carriage 178 may be assembled and attached to the holders 150, 155 as described above. The fixed roller 120 is provided and one end of the fixed roller is connected to holder 150 while the other end of the roller 120 is connected to holder 155. The rollers 120, 130 are provided so that the load or basket 180 may be maintained in a level position or horizontal to the truck bed. It is noted that moveable roller 130 and fixed roller 120 are preferably a roller or wheel that rotates about arms 131 and 121 (FIG. 6), respectively, which serve as parallel, coplanar axes. Further, both rollers 120, 130 may be on a pair of respective arms 123, 133 (FIG. 6) which extend an equivalent distance 135 (FIG. 6) downwardly from the holders 150, 155.

Both rollers 120, 130, are weight bearing so the rollers 120, 130 should be made of strong enough materials to support the desired load. For example, metal (titanium, aluminum, steel, metal alloys, ceramics, and hard plastics, etc.

In step 580, the pivot connectors 152, 157 are connected to the anterior ends of the holders 150, 155 and fixedly secured in place using, for example, a friction or press fit connection, threaded fasteners or pins.

In step 590, the front legs 50 and 55, support bars 70 and 75 and wheels 50 and 55 are provided. At one end, the legs 50 and 55 may connected to the wheels 50 and 55 using rivets and threaded fasteners, etc. Proximal to the other end of the legs 50 and 55, the support bars 70 and 75 may be rotatably connected to the legs 50 and 55. That is, one end of support bar 50, 55 may connected to the other end of corresponding leg 50, 55. Further, legs 50 and 55 may be joined, at the end the wheels 50, 55 are attached, by a bar 61.

In step 600, the rear legs 80 and 90 are provided and assembled including the wheels 20 and 25, pivots 30 and 35, extensions 40 and 45, first and second pairs of stability bars 84 and 86, and lower motor covers 85 and 95, actuators 90 and 100 and shafts 220. The wheels 20 and 25 are connected to the respective pivots 30 and 35. The pivots 30 and 35 are a type of connection that are locked in an extended position and can be unlocked and folded to decrease the length of the legs.

The lower motor covers 85 and 95 may be tubular with a first opening and a second opening and a sidewall extending therebetween. Also, there may be a slot (not shown) which allows a lever or support bar 70, 75 to fold close to a rear leg 80, 90. The pivots 30 and 35 may be connected to the extensions 40 and 45, respectively. These connections are fixed and may be made via a threaded fastener, friction or press fit, etc.

The leg extensions 40 and 45 are each connected to a shaft 220 corresponding to an actuator 90, 100. The connection between each extension and the 40 and 45 is a fixed connection that and may be made via a threaded fastener, friction or press fit, etc. The leg extension 40 and 45 are telescopic with a portion of the extensions 40 and 45 located within the covers 85 and 95 and the lower actuators 100, 110 configured to extend and retract the extensions 40 and 45 relative to the covers 85 and 95.

Shaft wheels 234 and 235 may be connected to the shaft 220. Shaft 220 is connected to the lower or posterior ends actuators 100, 110. Next, the shaft 220 and actuators 100, 110 are inserted into the respective cover 85, 95.

Casters or wheels may be connected to the posterior ends of the legs 80, 90. Initially, pivots 30, 35 may be connected to the respective extensions 40, 45. Then, wheels may be connected to the extensions 40, 45.

In step 610, the front legs 50, 55 are connected to the rear legs 80, 90. As shown in FIGS. 1 and 2B, the front legs are pivotally connected to the legs 80, 90 at two points. The first point is at the connection of support bars 70, 75 to both the shafts 220 between the wheels 234 and 235 on each shaft. The second point is between the posteriorly extending end of the front legs 50, 55 and the respective cover 85, 95. Both of these connections may be made using pins or threaded fasteners, etc.

In step 620, the control system 395 may be electrically and/or mechanically connected to the upper and lower actuators 160, 165, 100, 165 as well as the push mechanism 230.

Figure 8A:
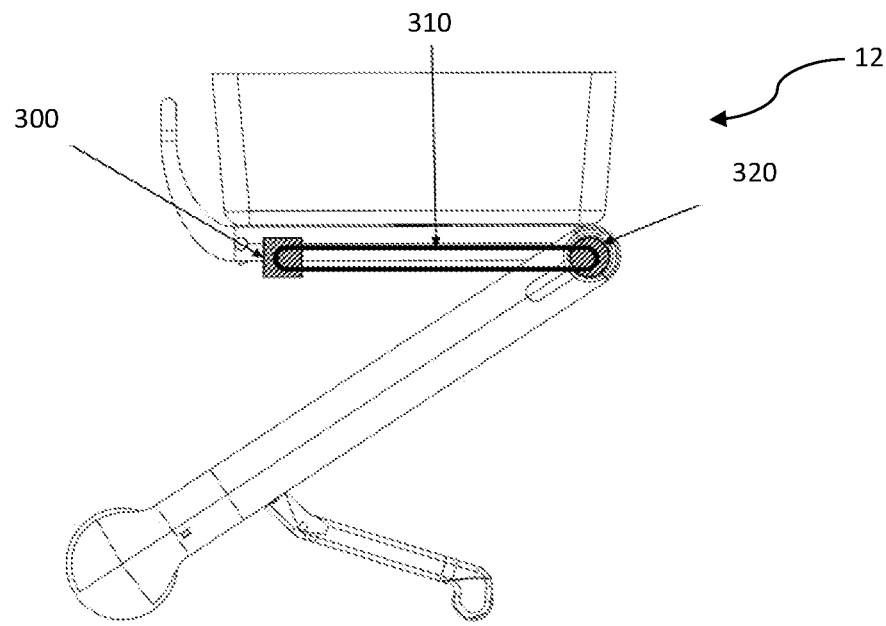
FIG. 8A is a side view of a second embodiment of a cart according to this disclosure.
Figure 8B:
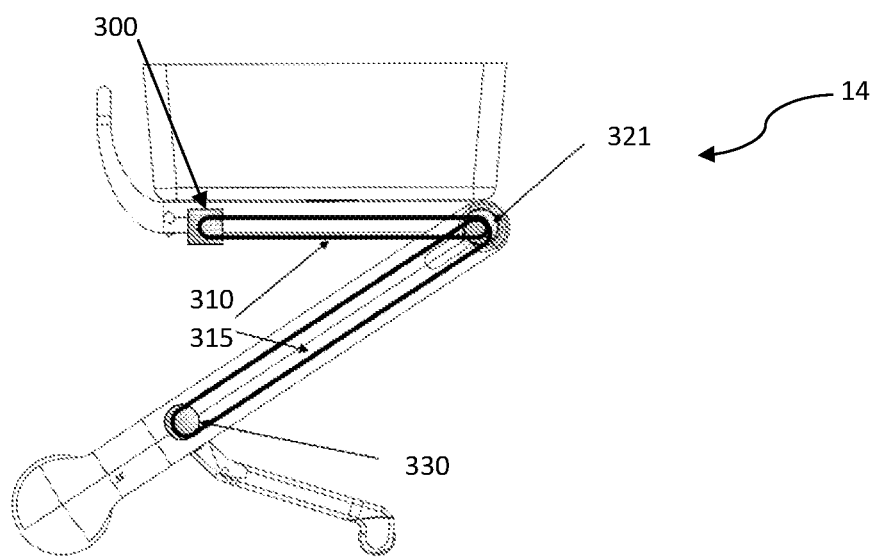
FIG. 8B is a side view of a third embodiment of the shopping cart according to this disclosure.

Other configurations of the cart 10 and the automation are envisioned. For example, FIGS. 8A and 8b depict other embodiments, according to this disclosure, of the carts 12 and 14. In embodiment 8A, the upper actuators 160, 165 are replaced with a stepper motor 300 with a gear box including timing belt 310. The timing belt 310 extends from the gear box of the stepper motor 300 to a gear 320 on the shaft 335 (FIG. 8C) which is connected to the rear legs 80, 90. This gear 320 is fixed on the back legs. This allows for the retraction and extension of the rear legs 80, 90. The stepper motor 300 may be connected to one of the lateral supports 148, 149 and may be disposed within or adjacent to the corresponding top motor holder 150, 155 or the motor 300.

Embodiment 14 includes an additional feature to allow the stepper motor 300 to extend and retract the front legs 50, 55 as well as the back legs. A free spinning timing belt gear 321 is placed on shaft 335, and a front leg gear 330 is connected to the front legs. Then, a second timing belt 315 is placed around gears 320 and 330.

Figure 8C:
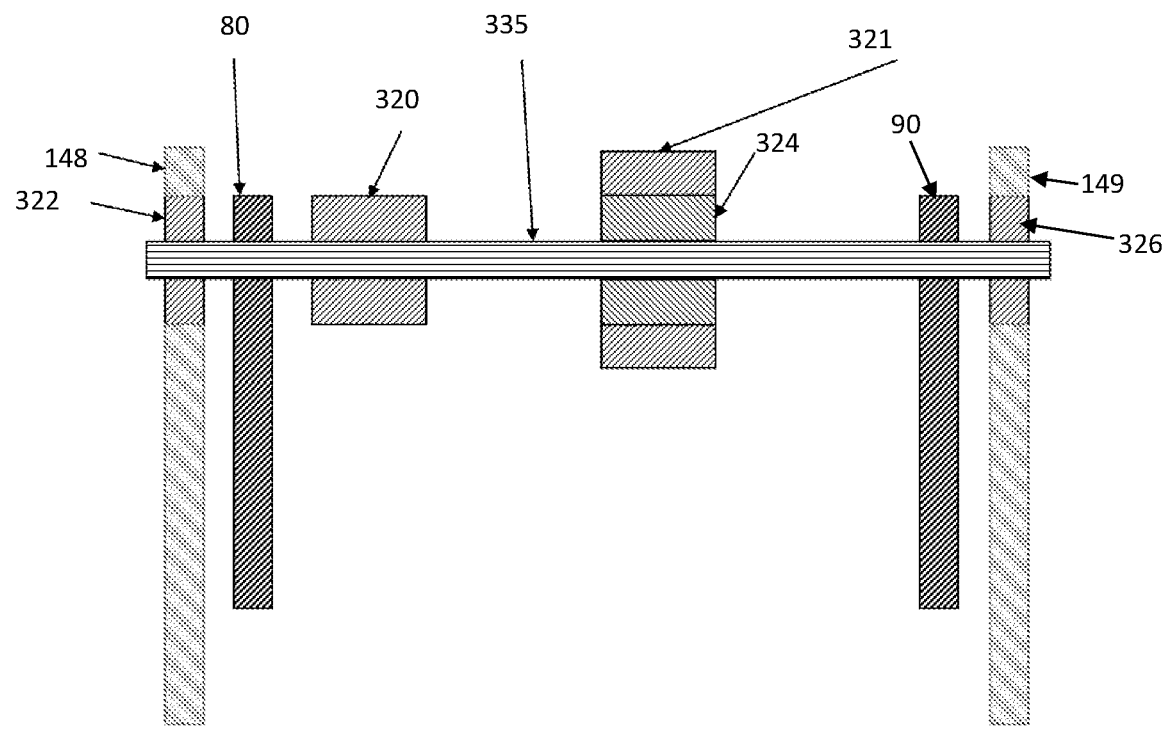
FIG. 8C is a top cross-sectional view of a shaft connected between the upper or anterior portion of the rear legs of the cart of FIG. 8B.
Figure 9:
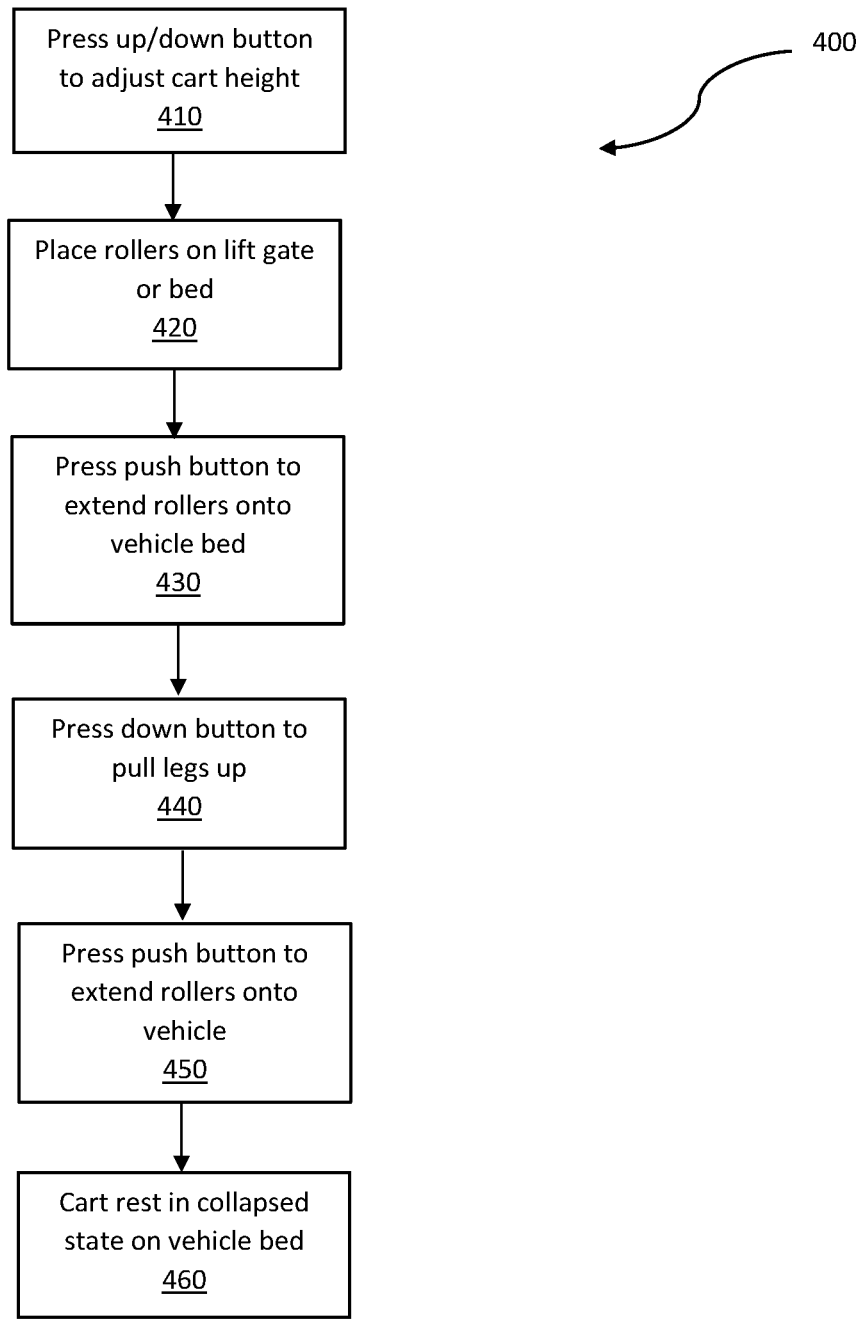
FIG. 9 is flow diagram of a method of loading the cart, according to this disclosure into a vehicle.

FIG. 8C depicts a top cross sectional view of shaft 335 with gears 320 and 321, shaft connected to the anterior ends of the legs 80, 90 and the bearings 322, 324 and 326.

It is envisioned that the cart 10 may be modified to include additional features such as a motor configured to move the cart 10 so that the user force is not required to push the cart. Further, it is envisioned that the cart 10 may include sensors that allow the cart 10 to avoid obstacles and stay as close to the user as the cart automatically moves through a store or other environment that the cart is used.

Figure 11:
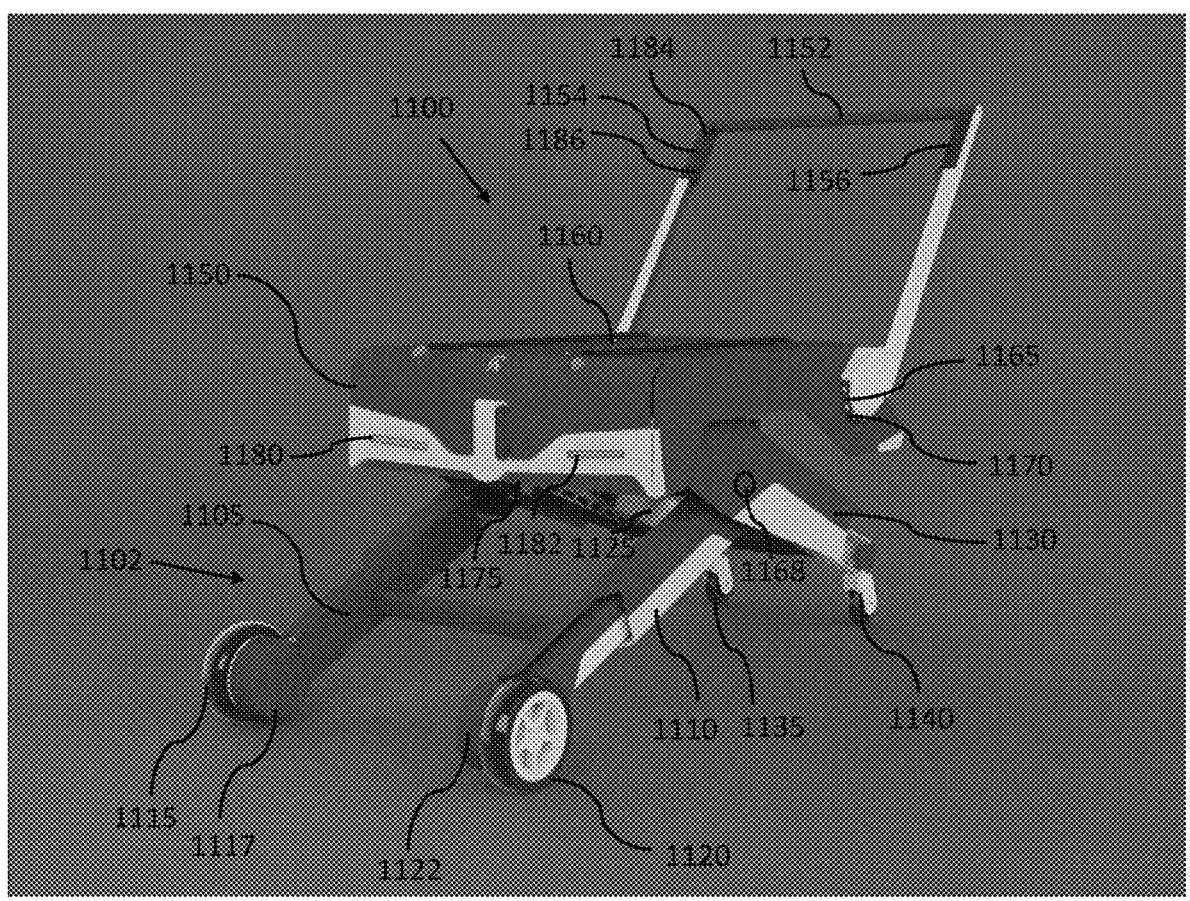
FIG. 11 is a perspective view of another illustrative embodiment of a self-loading cart.

Referring now to FIG. 11, an exemplary embodiment of a cart 1100, which may be any type of cart including, but not limited to a shopping cart, a utility cart, a moving cart, a walker, a chair, a bed, etc. As depicted in FIG. 11, the cart 1100 includes, but is not limited to a shopping cart having a support structure 1102 including but not limited to two front legs 1105 and 1110 having wheels 1115 and 1120 respectively. The support structure 1102 further includes but is not limited to two rear legs 1125 and 1130 having wheels 1135 and 1140 respectively. In an exemplary embodiment, wheels 1115 and 1120 are electric motor driven wheels with the motors residing within housing 1117 and 1122. In various embodiments the number of legs and wheels is not limited to four. For example, cart 1100 may use three legs and three wheels or could use two legs and two wheels or one leg and one wheel with an active control system for balancing cart 1100 with such a configuration. Alternatively, additional legs and wheels could be used for added support or redundancy.

Cart 1100 includes a chassis 1150 coupled to support structure 1102. Chassis 1150 is configured to support a shopping basket secured to a load platform 1160, or other receptacle for holding items. Alternatively, Chassis 1150 may be configured to support a tray, a seat, or a bed, etc. A handlebar 1152 is coupled to carriage 1150. Handlebar 1152 may, in some embodiments be foldable so that cart 1100 can be folded into a compact state for storage. Handlebar 1152 may include a variety of controls for operating cart 1100. Controls may include but are not limited to force input transducers 1154 and 1156 (e.g., strain gauges) which may be used to detect force inputs on the handlebar 1152. Other types of controls can be used including but not limited to buttons, potentiometers, etc. Force input transducers 1154 and 1156 may be used to control motion of the shopping cart. For example, equal pressure on force input transducers 1154 and 1156 of handlebar 1152 will cause cart 1100 to move forward by commanding the drive motors for wheels 1115 and 1120. Steering may be accomplished by providing more or less pressure to the handlebar 1152 and effectively more or less hand pressure to force input transducers 1154 and 1156. If more pressure is put on force input transducer 1154, for example, and less pressure on force input transducer 1156, cart 1100 will turn to the right by causing an increase in torque on wheel 1120 and a decrease in torque on wheel 1115. Similarly, if more pressure is put on force input transducer 1156, for example, and less pressure on force input transducer 1154, cart 1100 will turn to the left by causing an increase in torque on wheel 1115 and a decrease in torque on wheel 1120. In various embodiments rear wheels 1135 and 140 may freely swivel. In accordance with other embodiments, instead of differentially driving wheels 1115 and 1120, steering may be done by actuating wheels 1135 and 1140 to turn cause the cart 1100 in the desired direction.

In accordance with various embodiments, any number of sensors 1165 and 1170, for example, may be placed at various locations on any part of cart 1100, including but not limited to carriage 1150. Sensors 1165 and 1170 are exemplary of any of a variety of sensors and any number of sensors that may be located at any position on cart 1100. For example, sensors 1165 and 1170 may be but are not limited to light sensors, thermal sensors, cameras, laser sensors, capacitive sensors, accelerometers, temperature sensors, ultrasonic sensors, RADAR, LIDAR, etc. Further, in accordance with exemplary embodiments, angle encoders may be positioned at one or more joints of legs 1105, 1110, 1125, and 1130. Angle encoders such as but not limited to angle encoder 1168 may be mechanical encoders, optical encoders, on-axis magnetic encoders, off-axis magnetic encoders, capacitive encoders, absolute encoders, incremental encoders, etc. Angle encoder 1168, for example, provides relative angular positioning between legs 1110 and 1130 which in turn, knowing the length of legs 1110 and 1130, enables a simple geometric conversion to the height of carriage 1150.

In accordance with various embodiments, cart 1100 includes one or more motor control units (MCUs) which are configured to selectively control the torque on wheels 1115 and 1120. The MCUs may be any of a variety of controllers including but not limited to analog controllers, digital controllers, microprocessors, Application-Specific Integrated Circuits (ASICs) and the like. The MCUs may be commanded by receiving signals from force input transducers 1154 and 1156 or other user input devices or from receiving signals from a main Central processing unit (CPU) which may be programmed to carry out a variety of instructions. Such instructions may be but are not limited to self-driving functionality including autonomous user-following, autonomous obstacle avoidance, autonomous path following, autonomous destination finding, autonomous vehicle finding, autonomous vehicle self-loading, and autonomous self-storage. The CPU may receive signals from any of the sensors including but not limited to 1165 and 1170. An on-board rechargeable battery unit 1175 may be located in chassis 1150 or any other convenient location on cart 1100. On-board rechargeable battery unit 1175 is configured to power the drive motors, MCUs, CPU, sensors and other accessories. In various embodiments, the onboard rechargeable battery unit 1175 may be any type of rechargeable battery unit including but not limited to 12 Volt (V) rechargeable battery units having lithium-ion or other types of battery cells. In accordance with various embodiments, a charging port 1176 may be any of a variety of charging ports including but not limited to any version of universal serial bus (USB) port, or any other type of electrical power connector port.

In various embodiments cart 1100 may include any of a variety and number of lights of which lights 1180 and 1182 are an example. Lights 1180 may be LED lights or any other type of lights. Also, lights 1180 and 1182 may be guiding lights, warning lights, decorative lights, or indicator lights. Further, in various embodiments there may be any number or type of user input devices may be included such as but not limited to a lock/unlock switch 1184 configured to lock or unlock handle 1152, a load button 1186 configured to start an autonomous self-load function (and in various embodiments is also activated for starting an autonomous self-unload function). Buttons 1184 and 1186 may be but are not limited to mechanical switches, capacitive switches, digital switches, software defined switches on a graphical user interface or the like. Weight sensors may be included within chassis 1150 which are configured to provide a continuous output of the weight of the load within a basket 2010 (see FIGS. 24 and 25) supported on platform 1160. Chassis 1150 may also include product identifying devices, such as but not limited to Radio Frequency Identification (RFID) readers, Universal Product Code (UPC) readers, cameras, or other product identifier detecting devices which allow for automated self-checkout services.

Figure 12:
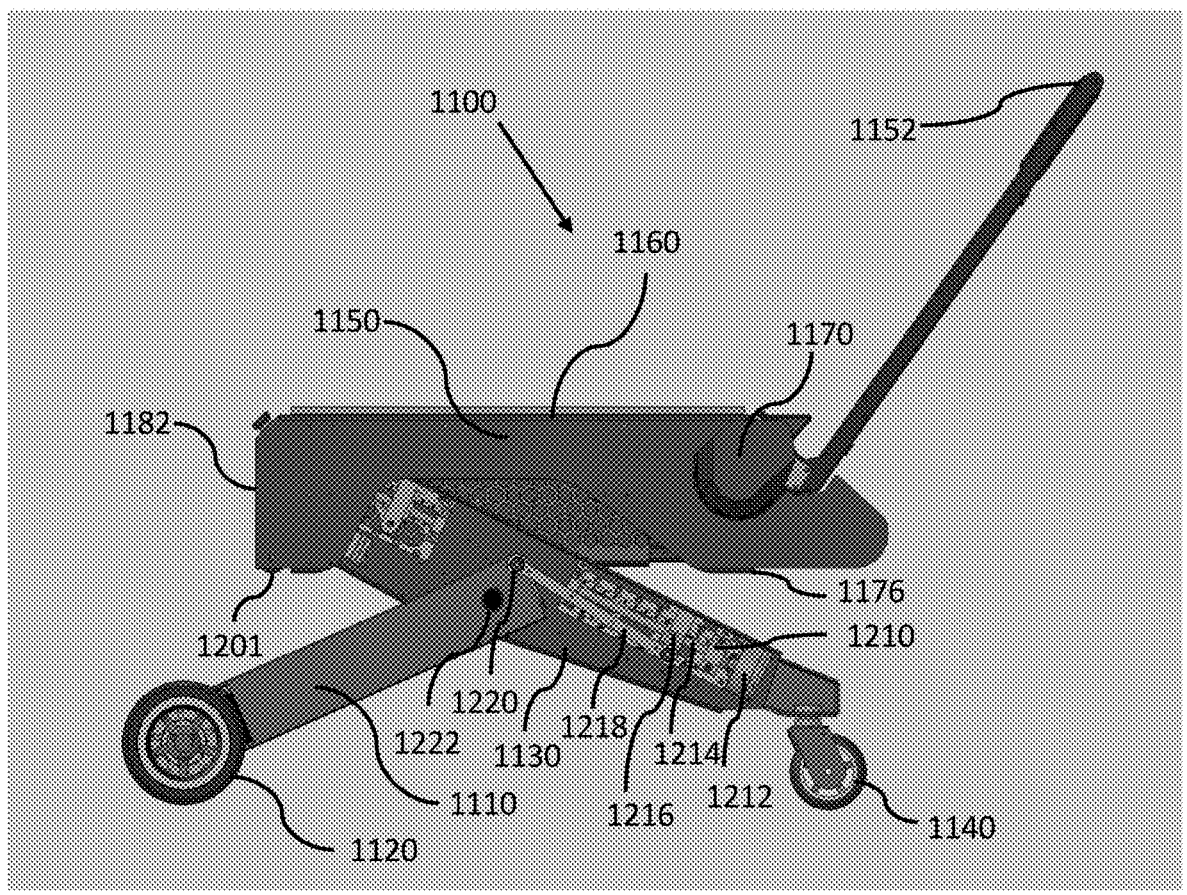
FIG. 12 is a side partial cutaway view of the cart of FIG. 12.
Figure 13:
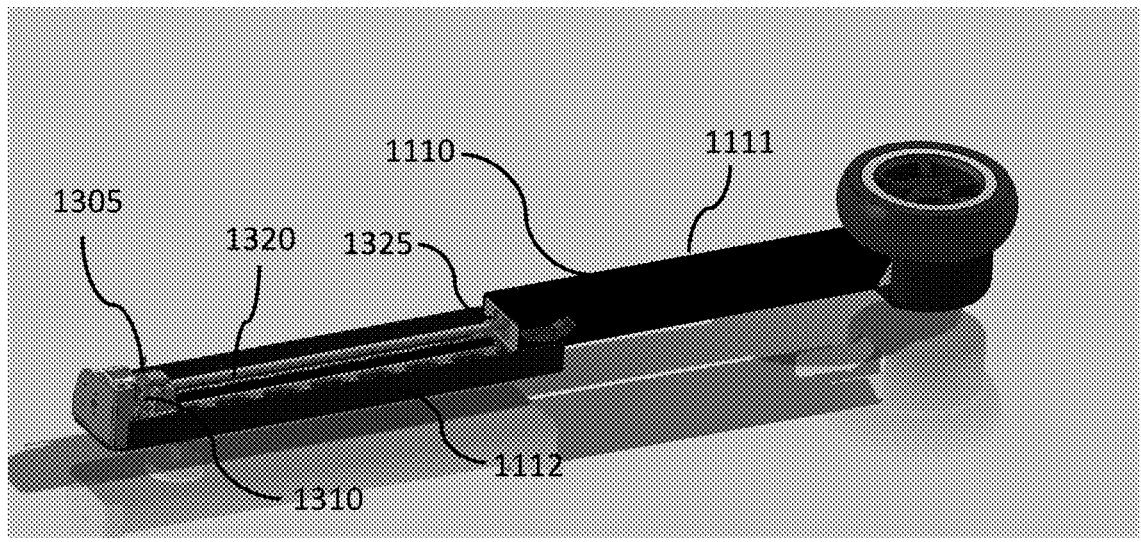
FIG. 13 is a perspective view of a front leg, of the cart of FIG. 12, in an extended state.

Referring now to FIG. 12, a cutaway of rear leg 1130 depicts some of the mechanical structure within rear leg 1130. Rear leg 1130 may include an actuator 1210. Actuator 1210 may be a mechanical linear actuator including a drive motor 1212 that turns a lead screw 1214 which drives a travelling-nut 1216 to move along the lead screw 1214. A connecting rod 1218 is coupled to travelling-nut 1216 on one end and to a push-point 1220 which causes front leg 1110 to rotate about a pivot point 1222 relative to rear leg 1130. As rotation occurs at pivot point 1222, rear leg 1130 is also configured to extend. Other types of linear actuators may also be used such as but not limited to hydraulic actuators, pneumatic actuators, piezoelectric actuators, electro-mechanical actuators, among others. Front leg 1110 is extendable and includes a lower leg portion 1111 that is extendable relative to upper leg portion 1112, as depicted in FIG. 13. Front leg 1110 may contain a linear actuator 1305. In various embodiments a drive motor 1310 is configured to rotate lead screw 1320 that moves a travelling nut 1325 that is connected to lower leg portion 1111. Rear leg 1125 may be configured with actuation similar to rear leg 1130 and front leg 1105 may be configured with actuation similar to front leg 1110. In accordance with various embodiments, one or more support wheels or rollers 1201 may be used during loading or unloading (See also FIG. 17) to help move chassis 1150 onto a surface, such as but not limited to the cargo bed of a vehicle.

Figure 14:
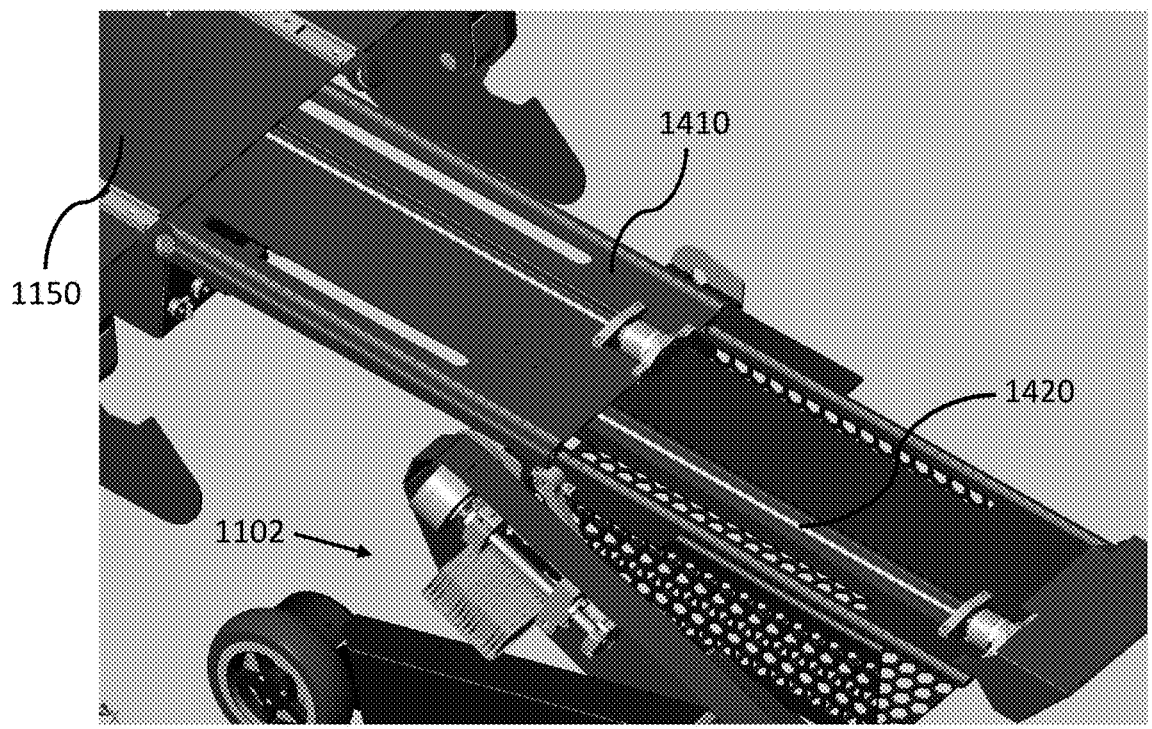
FIG. 14 is a perspective view of a carrier, of the cart of FIG. 12, being extended.
Figure 15:
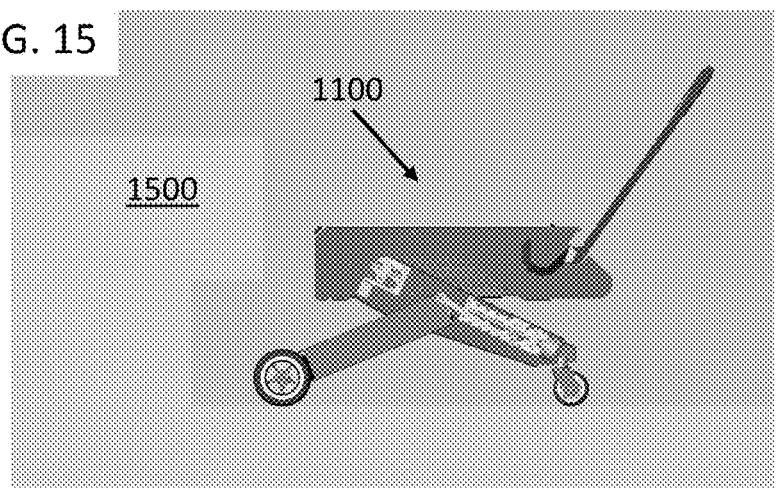
FIG. 15-FIG. 23 depict a side view of the steps in the process of the cart of FIG. 12 being loaded onto a stowage area.
Figure 16:
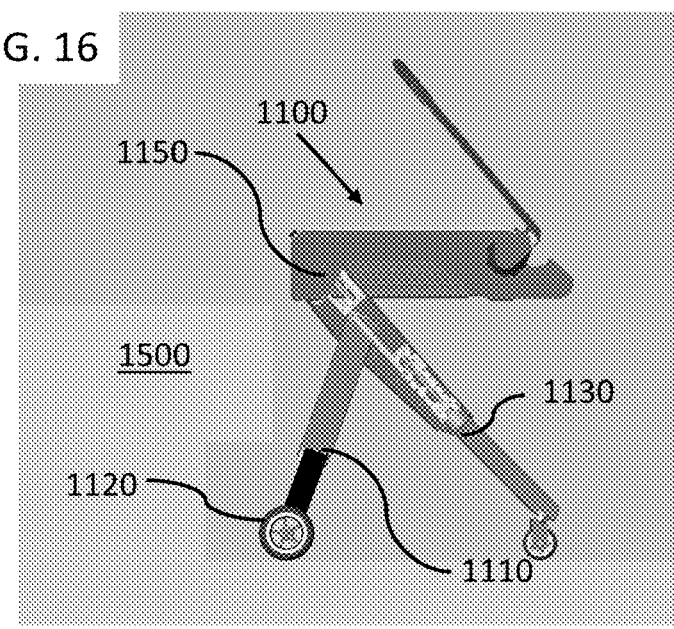
Figure 17:
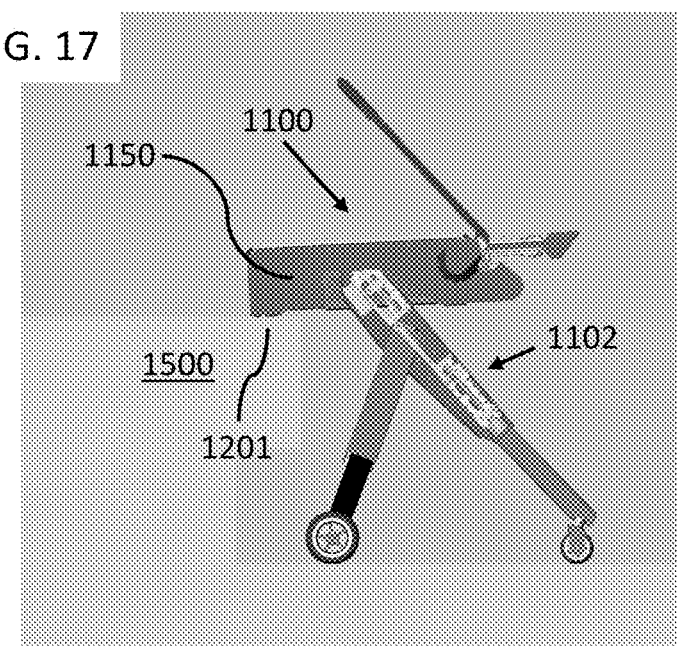
Figure 18:
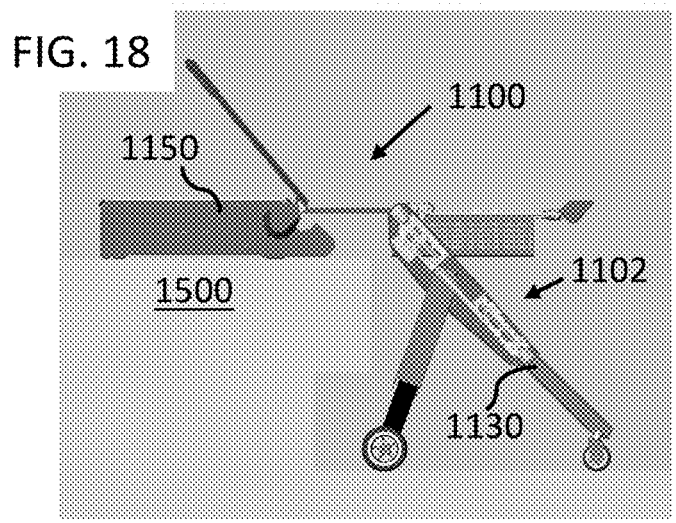
Figure 19:
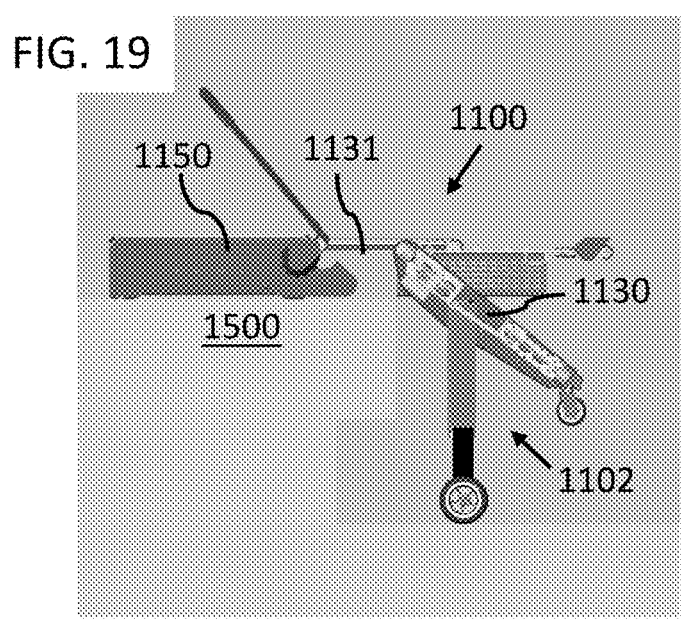
Figure 20:
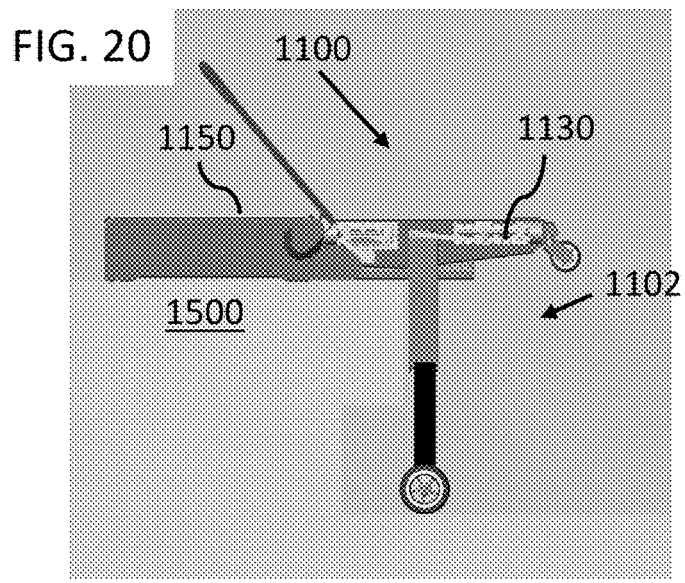
Figure 21:
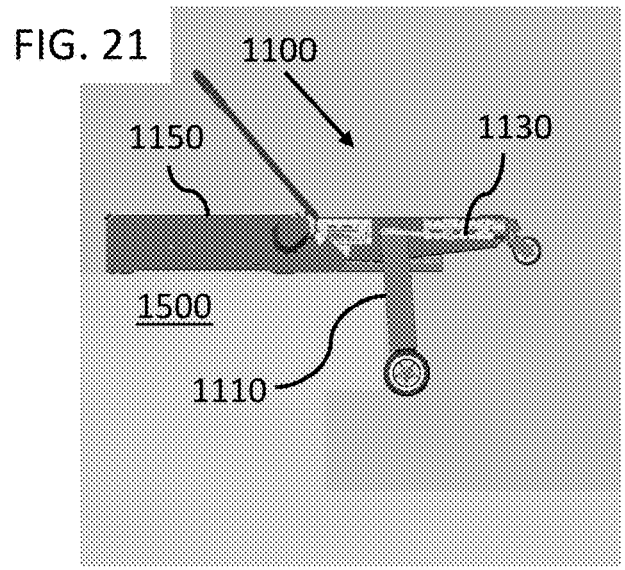
Figure 22:
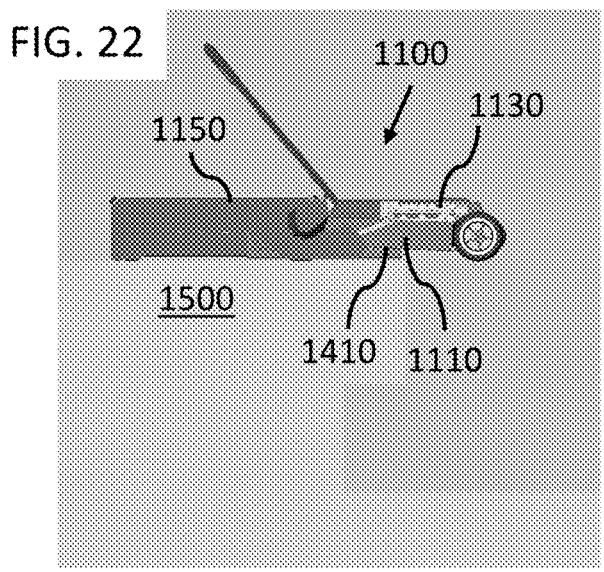
Figure 23:
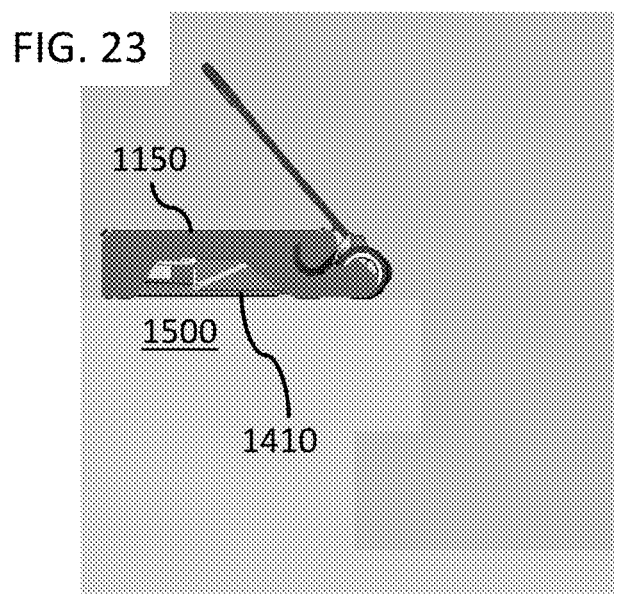
Figure 24:
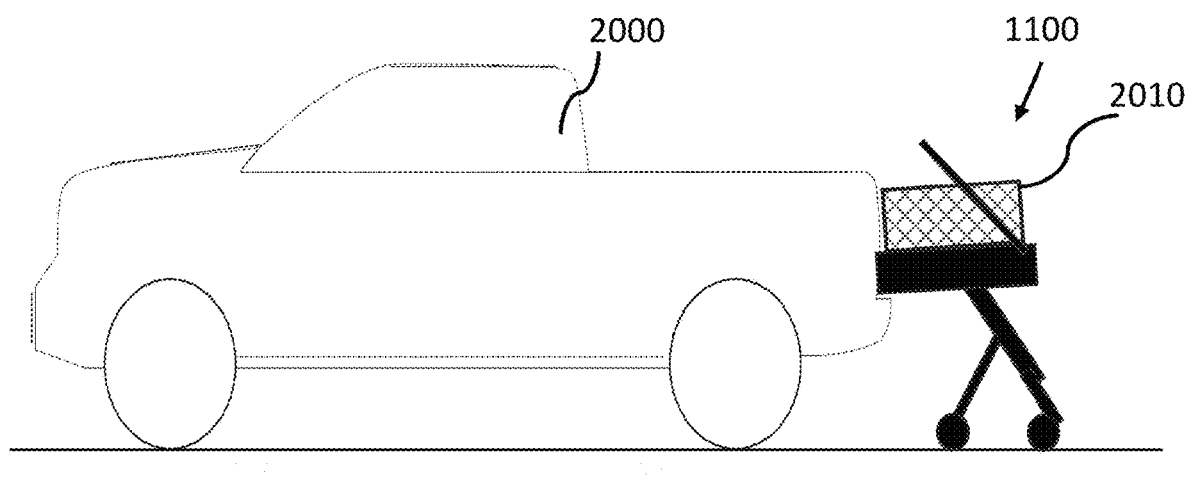
FIG. 24 depicts a side view of the cart of FIG. 12 being loaded onto the cargo bed of a pickup truck.
Figure 25:
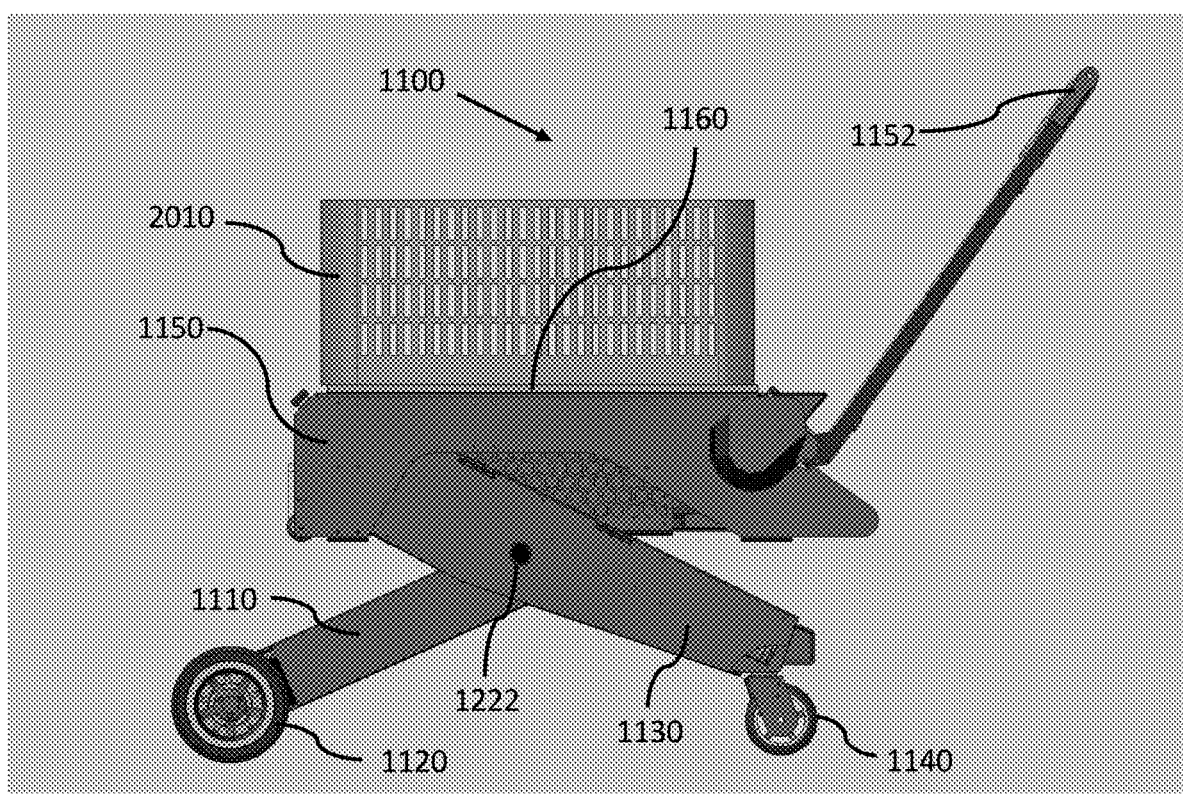
FIG. 25 depicts a side view of an illustrative embodiment of a cart having a basket attached thereto.

Referring now to FIG. 14, chassis 1150 is movable relative to support structure 1102. A carrier 1410 is attached to support structure 1102 and chassis 1150. Carrier 1410 is extendable and retractable by a linear actuator 1420 that causes chassis 1150 to move relative to support structure 1102 during the process of self-loading onto a vehicle and self-unloading from a vehicle. A process of autonomous self-loading by cart 1100 is depicted in FIGS. 15-24. In FIG. 15 cart 1100 is depicted approaching the rear deck of a vehicle 1500. Cart 1100 may be carrying a load. In most cases, deck 1500 which may be a cargo area of a vehicle, such as but not limited to a Sports Utility Vehicle (SUV), a minivan, a pickup truck, a station wagon, a van, a delivery truck, etc. Cart 1100 positions itself directly behind the vehicle deck 1500. As depicted in FIG. 16, wheel 1120 (and 1115) is held in position while front leg 1110 (and 1105) and rear leg 1130 (and 1125) are extended such that the bottom of chassis 1150 clears the height of vehicle deck 1500. As depicted in FIG. 17, once a suitable height is reached for chassis 1150, chassis 1150 is moved forward relative to support structure 1102 by motion of actuator 1420. Chassis 1150 is moved further forward until chassis 1150 is fully aboard vehicle deck 1500, as depicted in FIG. 18. Rear leg 1130 (and 1125) is coupled to a linear actuator 1131 which pulls rear leg 1130 toward chassis 1150 and the lower portion of rear leg 1130 (and 1125) is retracted, as depicted in FIG. 19. Rear leg 1130 (and 1125) is further pulled into engagement with chassis 1150, as depicted in FIG. 20. The lower portion of front leg 1110 (and 1105) is retracted, as depicted in FIG. 21. Front leg 1110 (and 1105) is then rotated up adjacent to carrier 1410. Carrier 1410 is then pulled into chassis 1150, as depicted in FIG. 23. As an example, FIG. 24 depicts cart 1100 self-loading into the cargo bed of a pickup truck 2000.

In various embodiments, instructions run on a CPU are configured to autonomously self-load cart 1100 into a vehicle or onto a storage platform. Instructions to autonomously unload cart 1100 generally reverse the self-loading steps. Such instructions may be run within any operating system environment, for example, the Linux Operating System may be used. In various embodiments, the instructions may be embedded in a microcontroller unit (MCU) or Application Specific Integrated Circuit (ASIC), e.g. in which no operating system is necessary. The instructions further include diagnostics, controls, sensors, communications, etc. In an example, cart 1100 may include a Bluetooth or other wireless communications chip which allows for communication with a user's mobile phone, various wireless networks, stores' checkout software, etc. Including Bluetooth communications enables a version of autonomous user following by cart 1100. Communications via Bluetooth or other wireless means also enables the ability for users to provide voice commands through the user's mobile phone to the cart command control. Cart 1100 may also include microphones which could similarly provide voice command ability directly on cart 1100.

Although a cart 1100 is described which is configured to carry a basket 2010 (see, e.g. FIGS. 24 and 25), cart 1100 can be configured to carry other types of loads while retaining some or all of the functionality described with regard to cart 1100. For example, cart 1100 can be fitted with a bed or stretcher instead of a basket 2010 such that the bed or stretcher would have the same autonomous self-loading and autonomous self-unloading into and out of an ambulance or other vehicle. Other types of cargo may also benefit from being configured as loads for a cart such as cart 1100. For example, it may be practical to configure cart 1100 to be able to carry a coffin and have it lifted in and out of a hearse. Many other applications can be configured without departing from the scope of the disclosure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

In a general sense, those skilled in the art will recognize that the various embodiments described herein can be implemented, individually and/or collectively, by various types of electro-mechanical systems having a wide range of electrical components such as hardware, software (e.g., a high-level computer program serving as a hardware specification), firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

I claim:

1. A cart comprising:
   a chassis configured to carry a load;
   a carrier coupled to the chassis;
   at least one carrier actuator coupled to the chassis and the carer;
   a support structure coupled to the carrier, the support structure having at least three wheels with at least one of the wheels being motor driven, the support structure configured to support the carrier and the chassis, the support structure having at least three legs, each leg coupled to one of the at least three wheels, each of the at least three legs being extendable, the support structure configured with support actuators to enable changing the height of the chassis, by causing each of the at least three legs to extend or retract, the at least one carrier actuators configured to extend the chassis from the carrier ad move the chassis horizontally relative to the support structure directly onto a storage platform and into a storage compartment, under sole power and guidance of the cart, while the support structure is in an uncollapsed state and the support structure is configured to be collapsible;

at least one sensor supported on the cart; and
at least one processor configured with software instructions that enable autonomous self-loading of the cart into a vehicle, the processing unit receiving signals from the at least one sensor and providing command signals to any of the wheel motor, the support actuators, and the at least one carrier actuators.

2. The cart of claim 1, wherein the chassis includes at least one bearing surface on the underside of the chassis.

3. The cart of claim 1, wherein the chassis includes at least one roller on the underside of the chassis.

4. The cart of claim 1, wherein the chassis is configured to hold a basket.

5. The cart of claim 1, wherein the support structure includes a front pair of legs and a rear pair of legs.

6. The cart of claim 1, wherein the support structure includes a front pair of legs and a rear pair of legs, the front pair of legs include wheels that are motor driven wheels and the rear pair of legs include wheels that swivel.

7. The cart of claim 1, wherein the processor includes instructions for autonomous self-driving modes.

8. The cart of claim 1, wherein the autonomous self-loading includes automatically raising or lowering the chassis to a height just above a cargo space of a vehicle, automatically pushing the chassis into a vehicle cargo space, collapsing the support structure and retracting the carrier and the support structure into or adjacent the chassis.

9. The cart of claim 1, wherein the support actuators include linear actuators.

10. The cart of claim 1, wherein the at least one carrier actuator include linear actuators.

11. The cart of claim 1, wherein the support structure includes at least one angle encoder configured to detect relative angle between two portions of the support structure or between a portion of the support structure and the carrier.

12. A cart comprising:
a chassis configured to carry a basket;
a support structure having a carrier coupled to the chassis, a pair of rear legs coupled to the carrier, and a pair of front legs coupled to the carrier, at least one of the pair of front legs and the pair of rear legs having motor driven wheels coupled thereto, at least one carrier actuator configured to extend the chassis from the carrier and to move the chassis horizontally relative to the carrier directly onto a storage platform and into a storage compartment, under sole power and guidance of the cart while the support structure is in an uncollapsed state, the pair of front legs including actuators which are configured to extend and retract the pair of front legs, and the pair of rear legs including actuators which are configured to extend and retract the pair of rear legs so that the height of the chassis may be selectively raised or lowered by controlled actuation of the front leg actuators and the rear leg actuators;
at least one sensor supported on the cart;
and at least one processor configured with software instructions that enable autonomous self-loading of the cart into a vehicle, the processing unit receiving signals from the at least one sensor and providing command signals to any of the wheel motors, the at least one carrier actuator, the front leg actuators, and the rear leg actuators.

13. The cart of claim 12, wherein the chassis includes at least one bearing surface on the underside of the chassis.

14. The cart of claim 12, wherein the chassis includes at least one roller on the underside of the chassis.

15. The cart of claim 12, wherein the chassis is configured to hold a basket.

16. The cart of claim 12, wherein the processor includes instructions for autonomous self-driving modes.

17. The cart of claim 12, wherein the autonomous self-loading includes automatically raising or lowering the chassis to a height just above a cargo space of a vehicle, automatically pushing the chassis into a vehicle cargo space, collapsing the support structure and retracting the carrier and the support structure into or adjacent the chassis.

18. The cart of claim 12, wherein the carrier actuators include linear actuators.

19. The cart of claim 12, wherein the support structure includes at least one angle encoder configured to detect relative angle between front legs and rear legs of the support structure or between either a front leg or a rear leg and the carrier.

20. A method of stowing a collapsible cart, the method comprising steps of:
adjusting autonomously a cart height such that a first end of a chassis of a cart is at or above the height of a stowage surface by braking a first pair of wheels coupled to a first pair of legs and actuating to extend or retract a second pair of legs;
extending autonomously the chassis from a carrier, directly onto a storage platform and into a storage compartment under sole power and guidance of the cart so that the whole chassis rests on the stowage surface, the chassis having at least one integrated roller configured to reduce friction with the stowage surface; and
retracting autonomously and stowing autonomously the first pair of legs, the second pair of legs, and the carrier into or adjacent the chassis.

* * * * *